United States Patent
Fukushima et al.

(10) Patent No.: US 6,944,107 B2
(45) Date of Patent: Sep. 13, 2005

(54) INFORMATION RECORDING MEDIUM, INFORMATION RECORDING AND REPRODUCTION METHOD, AND INFORMATION RECORDING AND REPRODUCTION APPARATUS

(75) Inventors: Toshiyuki Fukushima, Osaka (JP); Hiroshi Ueda, Osaka (JP); Motoshi Ito, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 491 days.

(21) Appl. No.: 10/275,803
(22) PCT Filed: Aug. 2, 2001
(86) PCT No.: PCT/JP01/06677
§ 371 (c)(1), (2), (4) Date: Nov. 8, 2002
(87) PCT Pub. No.: WO02/13192
PCT Pub. Date: Feb. 14, 2002

(65) Prior Publication Data
US 2003/0179670 A1 Sep. 25, 2003

(30) Foreign Application Priority Data
Aug. 3, 2000 (JP) ........................................ 2000-236214

(51) Int. Cl.[7] .............................................. G11B 7/00
(52) U.S. Cl. ............................... 369/47.53; 369/47.55; 369/53.22; 369/275.3
(58) Field of Search .......................... 369/275.3, 47.53, 369/47.55, 53.22

(56) References Cited

U.S. PATENT DOCUMENTS

| | | | | |
|---|---|---|---|---|
| 5,305,296 A | * | 4/1994 | Kono | ........................ 369/47.53 |
| 5,706,271 A | | 1/1998 | Hashimoto | ................... 369/116 |

FOREIGN PATENT DOCUMENTS

| | | |
|---|---|---|
| EP | 0 404 249 A1 | 12/1990 |
| EP | 0 751 509 A2 | 1/1997 |
| EP | 1 022 728 A1 | 7/2000 |
| JP | 11-175977 | 7/1999 |

* cited by examiner

Primary Examiner—A M Psitos
(74) Attorney, Agent, or Firm—Renner, Otto, Boisselle & Sklar, LLP

(57) ABSTRACT

An information recording medium includes a data recording area for recording data; and a parameter calibration area for recording recording condition information. The parameter calibration area includes a used area having the recording condition information recorded therein, an unused area having no recording condition information, and a border area for recording distinguishing information for distinguishing a border between the used area and the unused area. The border area is between the used area and the unused area.

47 Claims, 19 Drawing Sheets

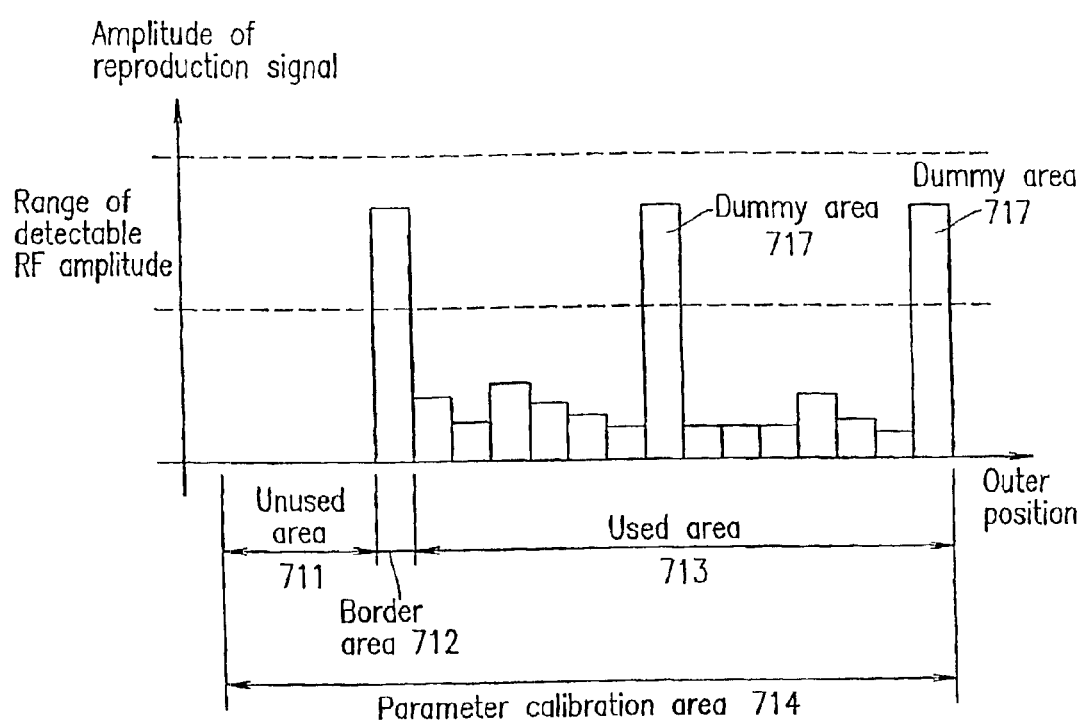

(a) ECC structure
(b) Sector structure

INFORMATION RECORDING MEDIUM, INFORMATION RECORDING AND REPRODUCTION METHOD, AND INFORMATION RECORDING AND REPRODUCTION APPARATUS

TECHNICAL FIELD

The present invention relates to an information recording medium, an information recording and reproduction method, and an information recording and reproduction apparatus. In particular, the present invention relates to an information recording medium, an information recording and reproduction method, and an information recording and reproduction apparatus for recording distinguishing information for distinguishing a border between an area already used for an adjustment and an area not yet used for adjustment in a parameter calibration area to which recording condition information is to be recorded.

BACKGROUND ART

As a circular information recording medium, an optical disc is known. Recently, as the recording density and the capacity of optical discs have been increased, it has become important to guarantee high reliability of the optical discs. In order to guarantee high reliability, an optical disc apparatus performs adjustment processing for obtaining recording conditions which are used when information is recorded on the optical disc mounted thereon. Adjustment processing includes recording power adjustment for obtaining an optimum recording power condition of a semiconductor laser for emitting light toward the optical disc.

Hereinafter, a general structure of an optical disc and conventional recording power adjustment will be described.

FIG. 13 shows a structure of a general disc medium. The disc medium can be a recordable optical disc such as, for example, a DVD-R or a DVD-RW. A circular optical disc 1301 has a plurality of tracks 1302 arranged concentrically or spirally. Each track 1302 is divided into a plurality of sectors 1303. The optical disc 1301 is roughly divided into a recording information area 1304, disc information areas 1305 and 1307, and a data recording area 1306.

The recording information area 1304 stores information for recording information on the optical disc 1301. The disc information areas 1305 and 1307 store parameters necessary for accessing a certain position of the optical disc 1301. The disc information area 1305 is also referred to as a lead-in area, and the disc information area 1307 is also referred to as a lead-out area. Data is recorded to or reproduced from the data recording area 1306.

FIG. 14 shows a structure of the recording information area 1304 shown in FIG. 13. The recording information area 1304 is provided at an inner position with respect to the disc information area 1305 (lead-in area). The recording information area 1304 includes a parameter calibration area 1401 ("PCA"; including power calibration area) used for, for example, performing recording power adjustment, and a recording management area 1402 (hereinafter, referred to as the "RMA": Recording Management Area) for storing, for example, a recording power value obtained using the parameter calibration area 1401 and information regarding a recording state of the optical disc 1301. In the case of a DVD-R, for example, as shown in FIG. 14, the parameter calibration area 1401 is located in an inner portion of the recording information area 1304, and the RMA 1402 is located in an outer portion of the recording information area 1304. It should be noted that all optical discs do not have this structure.

FIG. 15 shows a structure of an ECC block and a sector. FIG. 15 illustrates the relationship between the ECC block which is a unit for calculating an error correction code, and the sector recorded in the optical disc 1301. In a larger capacity DVD, one ECC block includes 16 sectors in order to provide both a high error correction capability and low redundancy. In FIG. 15, one ECC block includes four sectors for the sake of convenience.

Portion (a) of FIG. 15 shows a structure of the ECC block. An ECC block includes main data arranged in 172 bytes×48 rows, an inner code parity PI obtained by calculating an error correction code on a row-by-row basis of main data (in a horizontal direction), and an outer code parity PO obtained by calculating an error correction code on a column-by-column basis of main data (in a vertical direction).

A code including an inner code parity and an outer code parity is generally referred to as a product code. The product code is part of an error correction system which is very useful against both random errors and burst errors (locally concentrated errors).

For example, it is assumed that a burst error for two rows is generated by a scratch in addition to random errors. A burst error is mostly a 2-byte error and thus is correctable by the outer code. In a column having many random errors, some of the random errors cannot be corrected by the outer code and remain as errors, which are mostly corrected by the inner code. Even if some of the errors cannot be corrected even by the inner code, those errors can be corrected using the outer code again.

In the field of DVD, use of such a product code provides sufficient error correction capability while suppressing the parity redundancy. In other words, the capacity for the user data can be increased by the amount corresponding to the parity redundancy suppressed.

Portion (b) of FIG. 15 shows a structure of the sector. The outer code parity of the ECC block is uniformly divided for each of the sectors row by row. As a result, one sector is formed of data of 182 bytes×13 rows.

In the following description, the term "block" refers to the above-described ECC block.

Next, recording power adjustment will be described.

Recording power adjustment is performed after an optical disc is mounted on an optical disc apparatus, before information is recorded on the optical disc, or each time characteristics of the optical disc or the optical disc apparatus are changed by a prescribed level or more due to a temperature change or other factors.

Recording power adjustment obtains an optimum recording power condition by performing recording to and reproduction from a parameter calibration area. The optical disc apparatus records information to areas other than the parameter calibration area of the mounted optical disc, using the recording power condition obtained by the recording power adjustment.

Next, how the parameter calibration area is used in recording power adjustment will be described.

In the case of a DVD-R, the parameter calibration area includes 7088 sectors. Among the 7088 sectors, the optical disc apparatus can use 6832 sectors for recording power adjustment. To the RMA, information is recorded on a block-by-block basis. The RMA includes 701 blocks.

The RMA stores border information on a border between an area of the parameter calibration area to which information has been recorded by recording power adjustment (hereinafter, referred to as the "used area") and an area of the parameter calibration area to which no information has been recorded by recording power adjustment (hereinafter, referred to as the "unused area"). However, since the timing at which the RMA is updated is often synchronous with recording to the data recording area 1306, the border information is not necessarily the latest information. The border information is stored in the RMA on a block-by-block basis. Therefore, when, for example, recording power adjustment is performed on a sector-by-sector basis, the possibility that the border information stored in the RMA shows a correct border position is low. Accordingly, the border between the used area and the unused area needs to be directly detected.

In general, an RF amplitude detection processing section is used for directly detecting the border between the used area and the unused area. The RF amplitude detection processing section has a function of distinguishing the border between the used area and the unused area based on the level of the amplitude of a reproduction signal (RF amplitude).

FIG. 16 shows an exemplary structure of a parameter calibration area 1603 and an exemplary change in a recording power in conventional recording power adjustment performed using the parameter calibration area 1603.

The parameter calibration area 1603 is used from an outer periphery thereof on a sector-by-sector basis. For example, in one cycle of recording power adjustment, recording power condition information is recorded with the recording power being changed on a sector-by-sector basis from a sector located on the outer periphery. In FIG. 16, recording power condition information having five recording power conditions is recorded in five sectors in the parameter calibration area 1603.

Then, the recording power condition information recorded in the parameter calibration area 1603 is reproduced, and one of the five recording power conditions having the optimum reproduction state is obtained as a result of the recording power adjustment. The resultant recording power condition is used for recording information thereafter.

When a portion of the parameter calibration area 1603 is already used, i.e., when a portion of the parameter calibration area 1603 is a used area 1602, the RF amplitude detection processing section 561 detects the border between the used area 1602 and an unused area 1601. Recording power adjustment is performed using the unused area 1601 from the border. In this manner, the unused area 1601 becomes part of the used area 1602.

Hereinafter, how to use a parameter calibration area in a CD-WO will be described.

The recording format of a CD-WO is referred to as the "Orange Book".

FIG. 17 shows a structure of a parameter calibration area 1703 in a conventional CD-WO. In FIG. 17, the parameter calibration area 1703 includes a test area 1701 used by recording power adjustment and a counter area 1702 showing the state of use of the test area 1701.

In the case of the CD-WO, for example, as one sector in the test area 1701 is used by the recording power adjustment, information is recorded in one sector in the counter area 1702. In this case, by detecting the state of use of the test area 1701 recorded in the counter area 1702, the border between an unused area 1701A and a used area 1701B in the test area 1701 can be distinguished.

In the conventional recording power adjustment shown in FIG. 16, the recording power in the recording power condition information gradually decreases from the outer periphery to an inner periphery of the parameter calibration area 1603 during one cycle of recording power adjustment.

When such recording power information is recorded in the parameter calibration area 1603, the recording power for performing the recording to an area at the border between the unused area 1601 and the used area 1602 decreases. Therefore, the RF amplitude detection processing section 561 cannot correctly detect the border between the used area and the unused area. In the case where the RF amplitude detection processing section 561 incorrectly detects a point in the used area as the border between the unused area 1601 and the used area 1602 in the next cycle of recording power adjustment, two different records of recording power adjustment are written, which reduces the precision of recording power adjustment.

In the parameter calibration area 1703 of the conventional CD-WO shown in FIG. 17, the counter area 1702 is used. Therefore, in the case where a plurality of sectors in the test area 1701 are consumed in one cycle of recording power adjustment, a plurality of sectors in the counter area 1702 are also consumed, which increases the area used for recording power adjustment.

The present invention has an objective of providing an information recording medium, an information recording and reproduction method, and an information recording and reproduction apparatus for clearly distinguishing a border between a used area and an unused area and also reducing an area of a parameter calibration area which is consumed by one cycle of recording power adjustment.

DISCLOSURE OF THE INVENTION

According to one aspect of the invention, an information recording medium includes a data recording area for recording data; and a parameter calibration area for recording recording condition information. The parameter calibration area includes a used area having the recording condition information recorded therein, an unused area having no recording condition information and a border area for recording distinguishing information for distinguishing a border between the used area and the unused area. The border area is between the used area and the unused area.

In one embodiment of the invention, the recording condition obtained based on a reproduction state of the recording condition information defines an operation condition of an information recording and reproduction apparatus capable of mounting the information recording medium, the operation condition being used when the information recording and reproduction apparatus records data.

In one embodiment of the invention, the information recording medium is of a write-once type.

In one embodiment of the invention, the distinguishing information includes a plurality of marks and a plurality of spaces.

In one embodiment of the invention, the ratio of a magnitude of an amplitude of a signal, corresponding to a longest pattern including a longest mark among the plurality of marks and a longest space among the plurality of spaces, and a maximum value of the amplitude is at least a prescribed value.

In one embodiment of the invention, the prescribed value of 0.5.

In one embodiment of the invention, the signal is continuous for at least four frames.

In one embodiment of the invention, the border area includes at least one sector.

In one embodiment of the invention, the plurality of marks are recorded as an optimum piece of recording and reproduction condition information among the recording and reproduction condition information.

In one embodiment of the invention, the parameter calibration area further includes a plurality of dummy areas for recording dummy information which is recognized as a dummy of the border area, and a distance between two adjacent areas among the border area and the plurality of dummy areas is a prescribed value or less.

In one embodiment of the invention, the prescribed value is 32 sectors.

According to another aspect of the invention, an information recording and reproduction method used for an information recording medium including a data recording area for recording data and a parameter calibration area for recording recording condition information is provided. The method includes the steps of (a) recording the recording condition information in a portion of the parameter calibration area; (b) obtaining an optimum recording condition based on a reproduction state of the recording condition information recorded in the portion of the parameter calibration area: and (c) recording distinguishing information for distinguishing a border between a used area and an unused area in the parameter calibration area, the distinguishing information being recorded in a border area located between the used area and the unused area, the used area having the recording condition information recorded therein and the unused area having no recording condition information.

In one embodiment of the invention, the recording condition obtained based on the reproduction state of the recording condition information defines an operation condition of an information recording and reproduction apparatus capable of mounting the information recording medium, the operation condition being used when the information recording and reproduction apparatus records data.

In one embodiment of the invention, step (a) includes the step of detecting a border between an area having the recording condition information recorded therein and an area having no recording condition information, and recording the recording condition information in the area having no recording condition information in a direction from the border, both of the areas being in the parameter calibration area.

In one embodiment of the invention, step (c) includes the step of recording the distinguishing information based on the optimum recording condition.

In one embodiment of the invention, step (c) includes the step of recording information, capable of obtaining the recording condition based on a second determination criterion which is different from a first determination criterion used for obtaining the optimum recording condition in step (b), as the distinguishing information.

In one embodiment of the invention, the information recording and reproduction method further includes step (d) of determining whether or not the distinguishing information recorded in the border area is suitable based on the second determination criterion.

According to still another aspect of the invention, an information recording and reproduction method used for an information recording medium including a data recording area for recording data and a parameter calibration area for recording recording condition information is provided. The method includes the steps of (e) recording the recording condition information in a portion of the parameter calibration area; and (f) obtaining an optimum recording condition based on a reproduction state of the recording condition information recorded in the portion of the parameter calibration area. The recording condition information recorded in an area, in a used area of the parameter calibration area, in contact with an unused area functions as distinguishing information for distinguishing a border between the used area and the unused area, the used area and the unused area both being in the parameter calibration area, and the used area having the recording condition information recorded therein and the unused area having no recording condition information.

In one embodiment of the invention, the recording condition obtained based on the reproduction state of the recording condition information defines an operation condition of an information recording and reproduction apparatus capable of mounting the information recording medium, the operation condition being used when the information recording and reproduction apparatus records data.

In one embodiment of the invention, step (e) includes the step of detecting a border between an area having the recording condition information recorded therein and an area having no recording condition information, and recording the recording condition information in the area having no recording condition information in a direction from the border, both of the areas being in the parameter calibration area.

In one embodiment of the invention, the information recording medium further includes a recording condition storage area for recording a recording condition, and step (e) includes the step of recording the recording condition information based on the recording condition recorded in the recording condition storage area.

In one embodiment of the invention, step (e) further includes the step of recording the recording condition, recorded in the recording condition storage area, in an area in contact with the unused area.

According to still another aspect of the invention, an information recording and reproduction method used for an information recording medium including a data recording area for recording data and a parameter calibration area for recording recording condition information is provided. The method includes the steps of (g) recording the recording condition information in a portion of the parameter calibration area; (h) obtaining an optimum recording condition based on a reproduction state of the recording condition information recorded in the portion of the parameter calibration area; and (i) determining whether or not the recording condition information recorded in an area, in a used area of the parameter calibration area, in contact with an unused area functions as distinguishing information for distinguishing a border between the used area and the unused area, the used area and the unused area both being in the parameter calibration area, and the used area having the recording condition information recorded therein and the unused area having no recording condition information.

In one embodiment of the invention, the recording condition obtained based on the reproduction state of the recording condition information defines an operation condition of an information recording and reproduction apparatus capable of mounting the information recording medium, the operation condition being used when the information recording and reproduction apparatus records data.

In one embodiment of the invention, step (g) includes the step of detecting a border between an area having the recording condition information recorded therein and an area having no recording condition information, and recording the recording condition information in the area having no recording condition information in a direction from the border, both of the areas being in the parameter calibration area.

In one embodiment of the invention, the information recording and reproduction method further includes step (j) of, when the recording condition information recorded in the area in contact with the unused area is determined not to function as the distinguishing information, recording the distinguishing information in the unused area in a direction from the border.

In one embodiment of the invention, the information recording medium further includes a recording condition storage area for recording a recording condition.

In one embodiment of the invention, step (i) includes the step of recording the distinguishing information based on the recording condition recorded in the recording condition storage area.

In one embodiment of the invention, step (g) includes the step of recording the recording condition information based on the recording condition recorded in the recording condition storage area.

According to still another aspect of the invention, an information recording and reproduction apparatus used for an information recording medium including a data recording area for recording data and a parameter calibration area for recording recording condition information is provided. The apparatus includes a recording control section for recording the recording condition information in a portion of the parameter calibration area; and a recording adjustment information processing section for obtaining an optimum recording condition based on a reproduction state of the recording condition information recorded in the portion of the parameter calibration area. The recording control section records distinguishing information for distinguishing a border between a used area and an unused area both in the parameter calibration area in a border area between the used area and the unused area, the used area having the recording condition information recorded therein and the unused area having no recording condition information.

In one embodiment of the invention, the recording condition obtained based on the reproduction state of the recording condition information defines an operation condition of the information recording and reproduction apparatus, the operation condition being used when the information recording and reproduction apparatus records data.

In one embodiment of the invention, the recording adjustment information processing section detects a border between an area having the recording condition information recorded therein and an area having no recording condition information, and the recording control section records the recording condition information in the area having no recording condition information in a direction from the border, both of the areas being in the parameter calibration area.

In one embodiment of the invention, the recording control section records the distinguishing information based on the optimum recording condition.

In one embodiment of the invention, the recording control section records information, capable of obtaining the recording condition based on a second determination criterion which is different from a first determination criterion used for obtaining the optimum recording condition by the recording adjustment information processing section, as the distinguishing information.

In one embodiment of the invention, the recording adjustment information processing section determines whether or not the distinguishing information recorded in the border area is suitable based on the second determination criterion.

According to still another aspect of the invention, an information recording and reproduction apparatus used for an information recording medium including a data recording area for recording data and a parameter calibration area for recording recording condition information is provided. The apparatus includes a recording control section for recording the recording condition information in a portion of the parameter calibration area; and a recording adjustment information processing section for obtaining an optimum recording condition based on a reproduction state of the recording condition information recorded in the portion of the parameter calibration area. The recording condition information recorded in an area, in a used area of the parameter calibration area, in contact with an unused area functions as distinguishing information for distinguishing a border between the used area and the unused area, the used area and the unused area both being in the parameter calibration area, and the used area having the recording condition information recorded therein and the unused area having no recording condition information.

In one embodiment of the invention, the recording condition obtained based on the reproduction state of the recording condition information defines an operation condition of the information recording and reproduction apparatus, the operation condition being used when the information recording and reproduction apparatus records data.

In one embodiment of the invention, the recording adjustment information processing section detects a border between an area having the recording condition information recorded therein and an area having no recording condition information, and the recording control section records the recording condition information in the area having no recording condition information in a direction from the border, both of the areas being in the parameter calibration area.

In one embodiment of the invention, the information recording medium further includes a recording condition storage area for recording a recording condition, and the recording control section records the recording condition information based on the recording condition recorded in the recording condition storage area.

In one embodiment of the invention, the recording control section records the recording condition, stored in the recording condition storage area, in an area, in an unused area of the parameter calibration area, in contact with the unused area.

According to still another aspect of the invention, an information recording and reproduction apparatus used for an information recording medium including a data recording area for recording data and a parameter calibration area for recording recording condition information is provided. The apparatus includes a recording control section for recording the recording condition information in a portion of the parameter calibration area; and a recording adjustment information processing section for obtaining an optimum recording condition based on a reproduction state of the recording condition information recorded in the portion of the parameter calibration area, and determining whether or not the recording condition information recorded in an area, in a used area of the parameter calibration area, in contact with an unused area functions as distinguishing information for distinguishing a border between the used area and the unused area, the used area and the unused area both being in the parameter calibration area, and the used area having the recording condition information recorded therein and the unused area having no recording condition information.

In one embodiment of the invention, the recording condition obtained based on the reproduction state of the recording condition information defines an operation condition of the information recording and reproduction apparatus, the operation condition being used when the information recording and reproduction apparatus records data.

In one embodiment of the invention, the recording adjustment information processing section detects a border between an area having the recording condition information recorded therein and an area having no recording condition information, and the recording control section records the recording condition information in the area having no recording condition information in a direction from the border, both of the areas being in the parameter calibration area.

In one embodiment of the invention, the recording adjustment information processing section determines that the recording condition information recorded in the area in contact with the unused area does not function as the distinguishing information, the recording control section records the distinguishing information in the unused area in a direction from the border.

In one embodiment of the invention, the information recording medium further includes a recording condition storage area for recording a recording condition.

In one embodiment of the invention, the recording control section records the distinguishing information based on the recording condition recorded in the recording condition storage area.

In one embodiment of the invention, the recording control section records the recording condition information based on the recording condition recorded in the recording condition storage area.

BRIEF DESCRIPTION OF THE DRAWINGS

FIG. 7B shows a structure of a parameter calibration area and a change in an amplitude of a reproduction signal in Example 3.

BEST MODE FOR CARRYING OUT THE INVENTION

Hereinafter, the present invention will be described by way of illustrative examples with reference to the attached drawings.

An information recording and reproduction apparatus capable of mounting an information recording medium according to the present invention obtains a recording condition by executing recording adjustment processing using a parameter calibration area. In one embodiment, the obtained recording condition is recorded on the information recording medium. The recording condition recorded on the information recording medium is read for executing the next cycle of adjustment processing and can be used for obtaining a new recording condition.

Herein, a recording condition refers to an operating condition of an optical disc apparatus used when the optical pickup apparatus records information on an optical disc. The recording condition is obtained based on a reproduction state of the recording condition information.

The recording condition includes a pulse condition regarding a pulse of laser light emitted toward the optical disc.

Alternatively, the recording condition can be a set value of any of the various circuits included in the information recording and reproduction apparatus or code information indicating the set value.

EXAMPLE 1

In Example 1 according to the present invention is an information recording medium is provided in which a border between a used area and an unused area can be clearly distinguished by an RF amplitude detection processing section, and which is capable of reducing an area in a parameter calibration area consumed by one cycle of recording condition adjustment.

Figure 1:
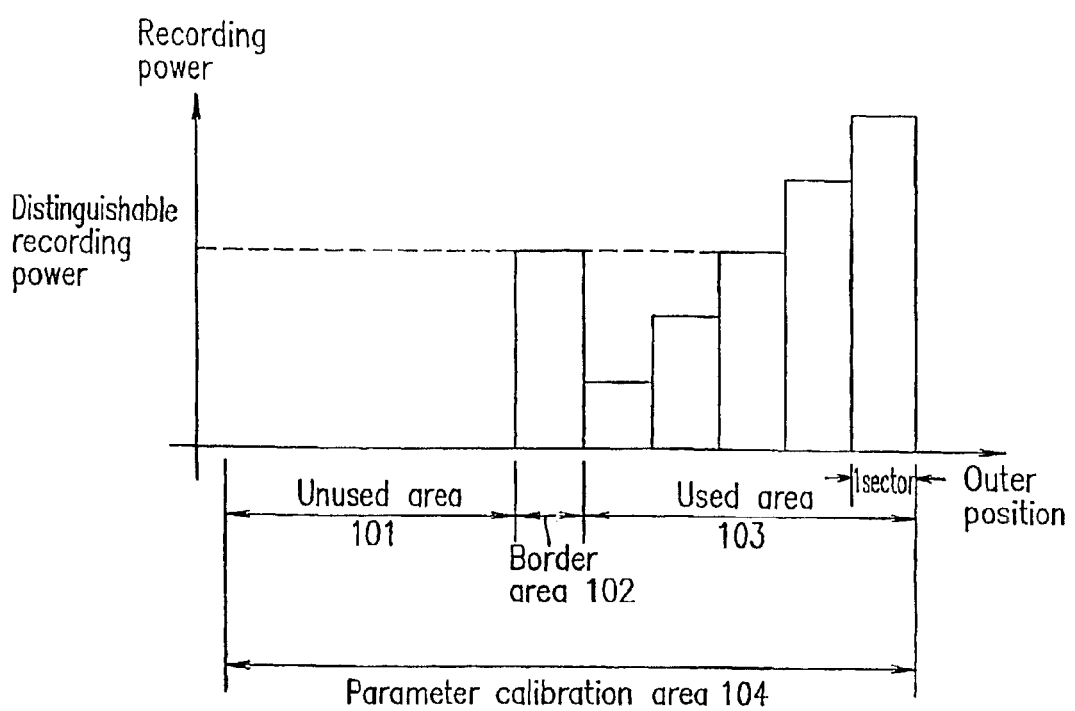
FIG. 1 shows a structure of a parameter calibration area and a change in a recording power when recording information in each sector in Example 1 according to the present invention.

FIG. 1 shows a structure of a parameter calibration area 104 and a change in a recording power when recording power condition information is recorded in Example 1 according to the present invention. The recording power condition information is recorded in a portion of the parameter calibration area 104 with the recording power being changed.

The parameter calibration area 104 includes a used area 103 having the recording power condition information recorded therein, an unused area 101 having no recording power condition information recorded, and a border area 102 for recording distinguishing information used for distinguishing a border between the used area 103 and the unused area 101. The border area 102 is located between the used area 103 and the unused area 101.

A signal obtained by reproducing the distinguishing information recorded in the border area 102 is distinguishable from a reproduction signal from the unused area 101 reproduced in a similar manner. The distinguishing information is recorded so that an amplitude of the signal obtained by reproducing the distinguishing information (RF amplitude) and an amplitude of the reproduction signal from the unused area 101 are distinguishable from each other by the RF amplitude detection processing section.

Figure 13:
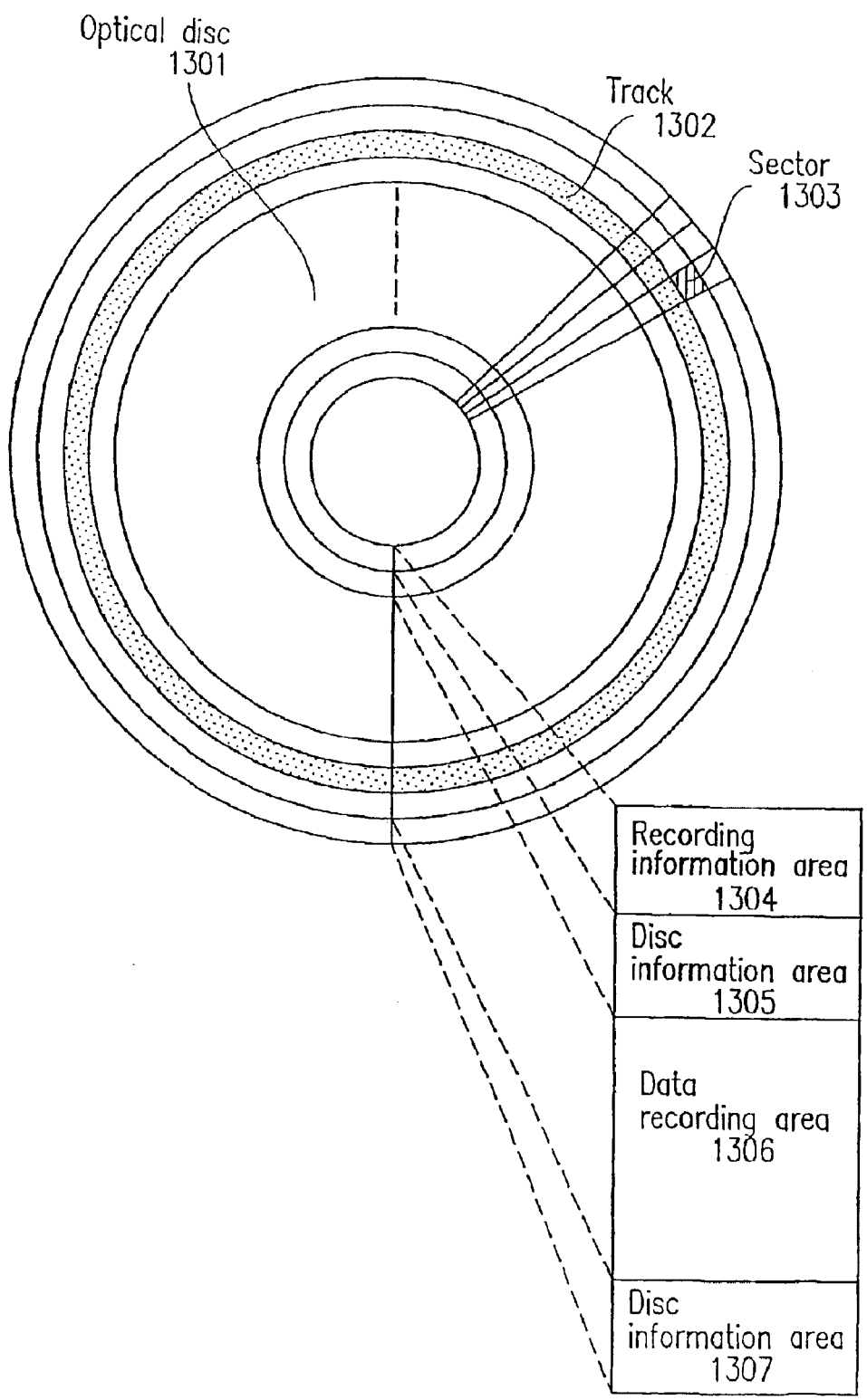
FIG. 13 shows a structure of a conventional general information recording medium.
Figure 14:
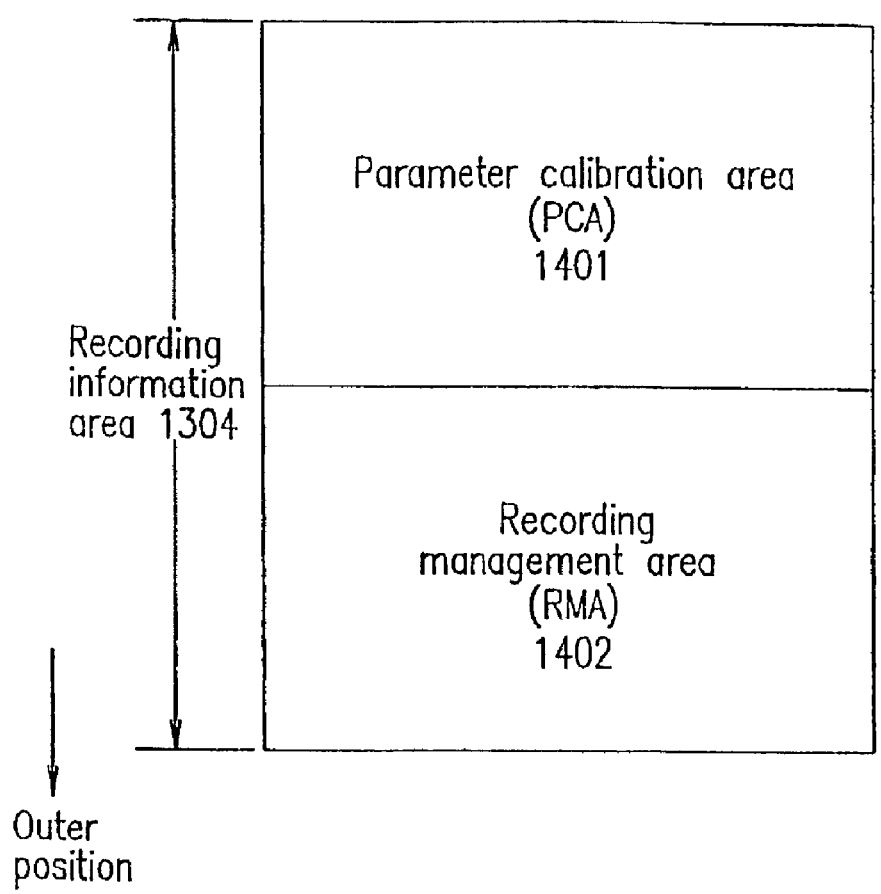
FIG. 14 shows a structure of a recording information area in a conventional information recording medium.

In FIG. 1, recording power condition information is recorded from an outer periphery to an inner periphery of the parameter calibration area 104. The data recording area 1306 (see FIG. 13) is generally located at an outer position with respect to the parameter calibration area 104. Since an area used for recording power adjustment is preferably close to the data recording area 1306 to which data is to be recorded using the recording power condition, the parameter calibration area 104 is used from the outer periphery.

Hereinafter, the relationship between the structure of an optical disc and a signal reproduced from the optical disc will be described. Then, specific examples of distinguishing information for distinguishing the border area 102 from the unused area 101 will be described.

Figure 2:
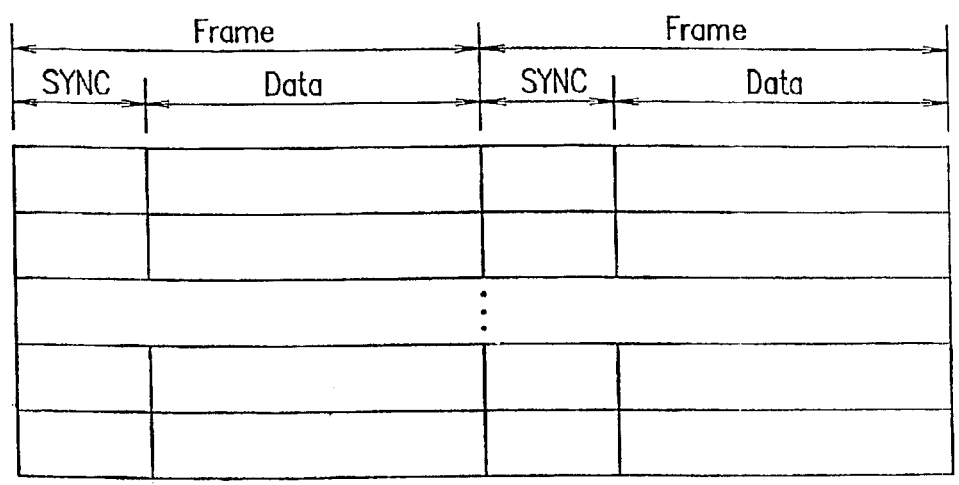
FIG. 2 shows a structure of frames included a sector.
Figure 15:
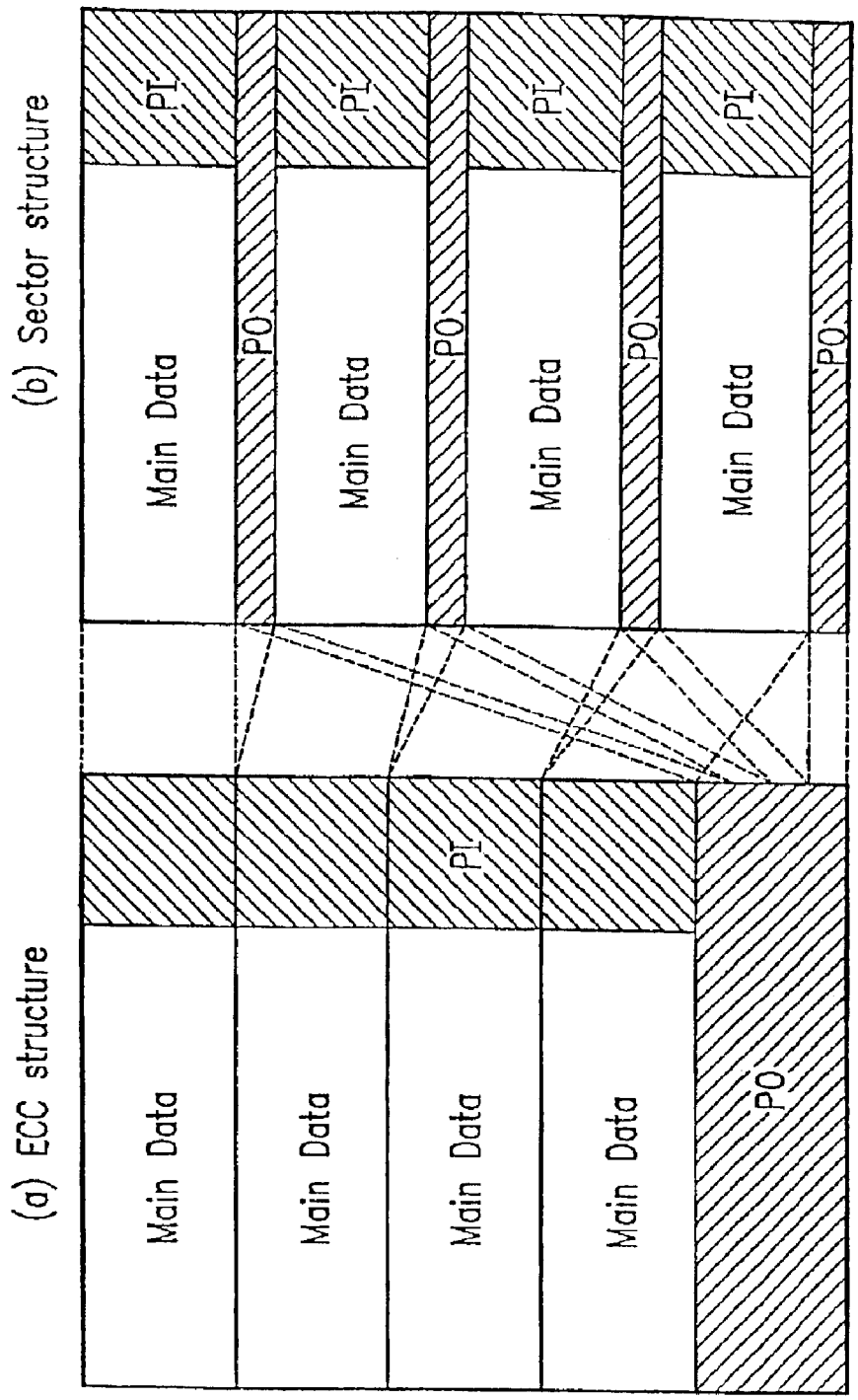
FIG. 15 shows a structure of an ECC block and a sector of a conventional information recording medium.
Figure 16:
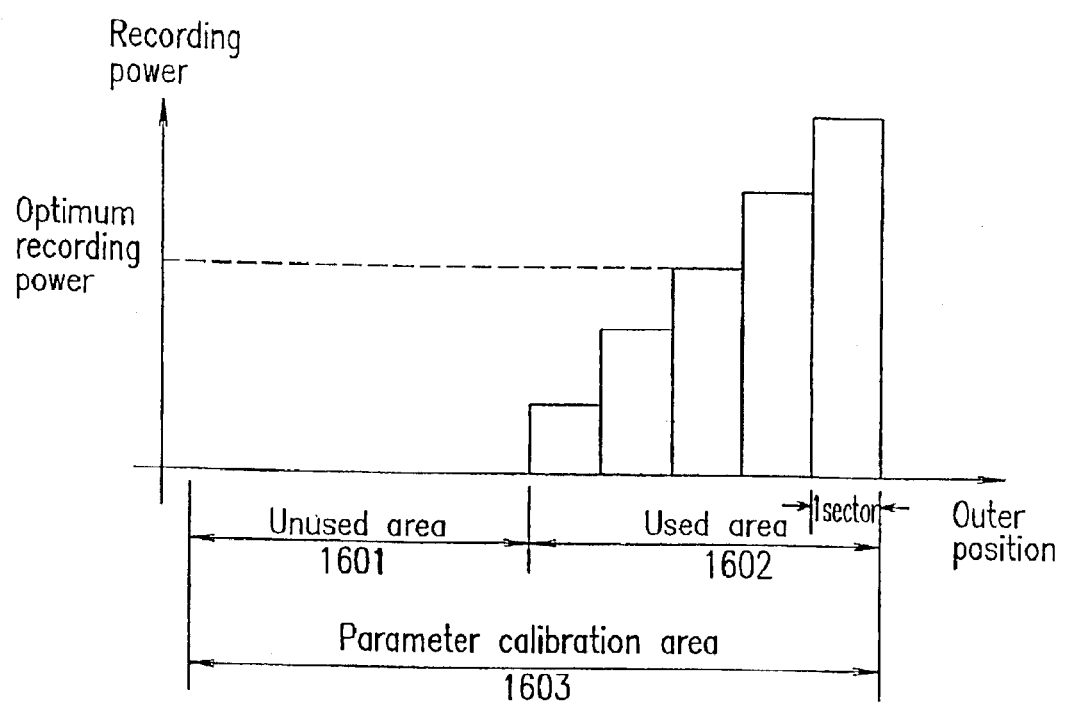
FIG. 16 is a structure of a parameter calibration area and a change in a recording power when recording information in each sector in a conventional example.
Figure 17:
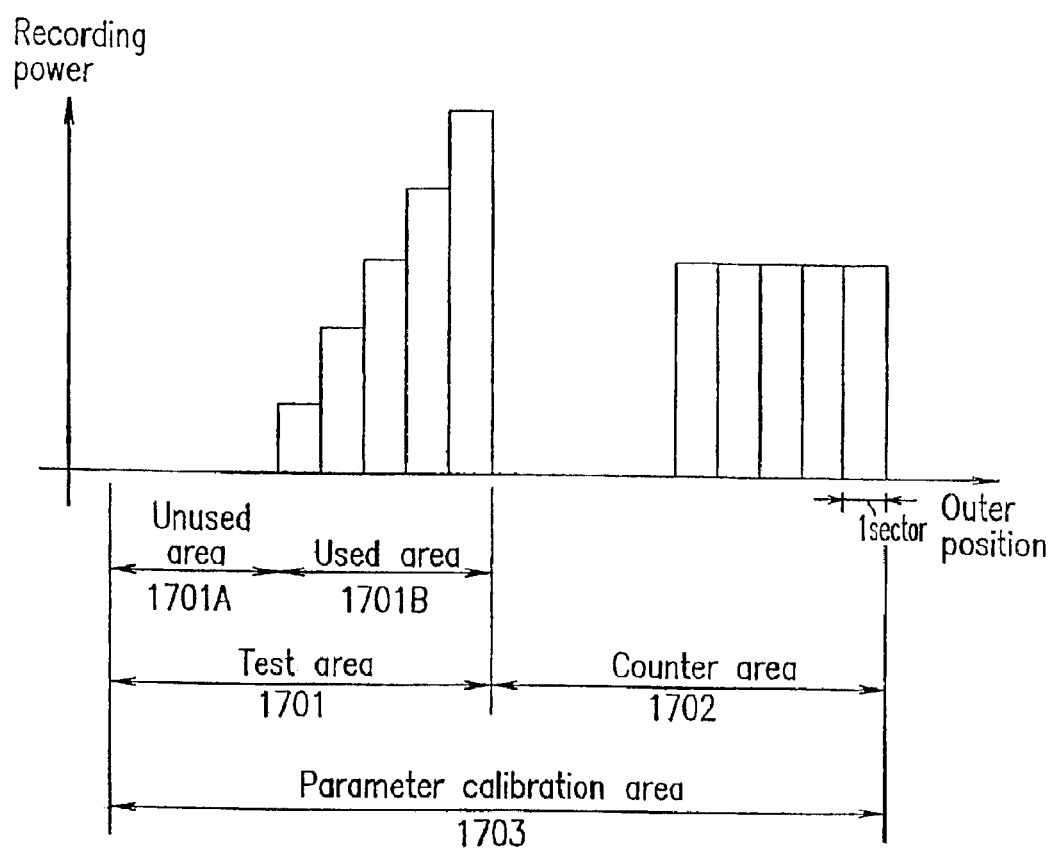
FIG. 17 shows a structure of a parameter calibration area of a conventional CD-WO.

The sector structure shown in portion (b) of FIG. 15 has a data structure shown in FIG. 2 of Example 1. The data is divided into two by a vertical line. Thus, the sector structure includes 91 bytes×2×13 rows. A 2-byte frame synchronization signal (SYNC) is added to 91-byte data so as to form 93-byte data. The 93-byte data is referred to as a frame. Namely, one row includes two frames, and one sector includes 26 frames.

Figure 3:
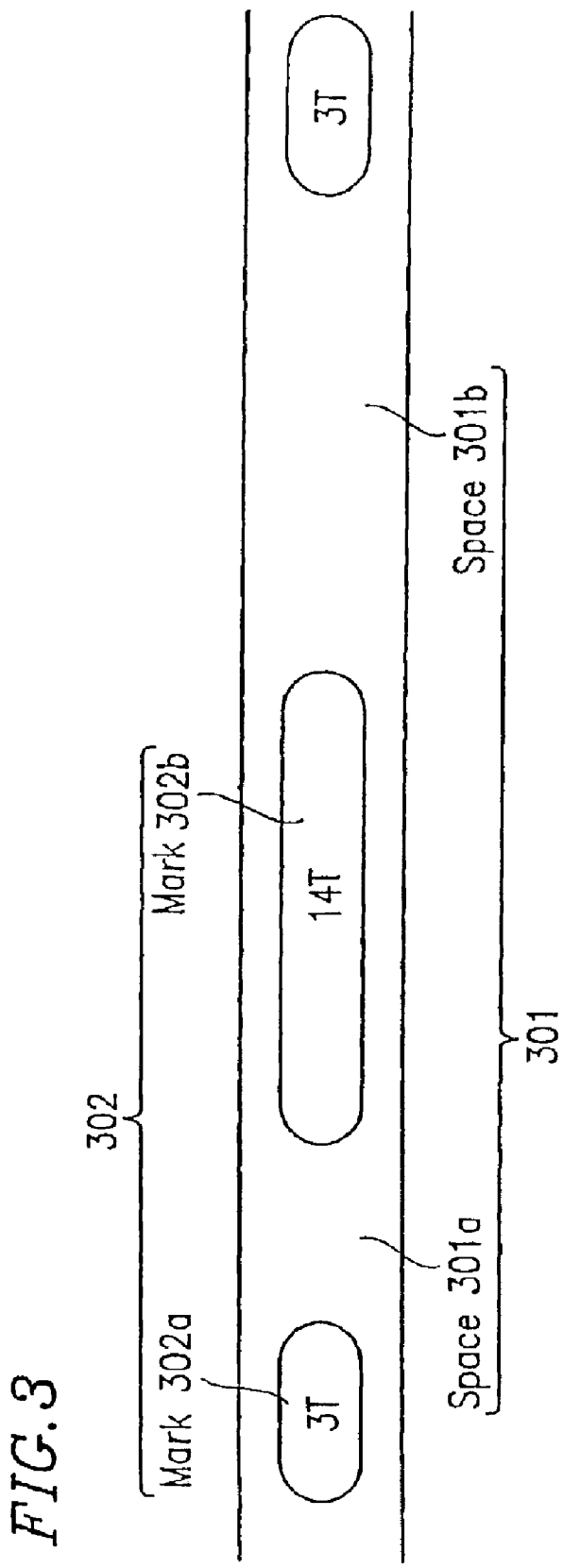
FIG. 3 shows marks in a frame.

FIG. 3 shows a specific structure of a frame. As shown in FIG. 3, one frame includes a plurality of marks 302 (for example, marks 302a and 302b) and spaces 301 (for example, spaces 301a and 301b) between the plurality of marks 302. Each mark 302 is a minimum unit of data on the optical disc.

FIG. 3 shows a 3T mark 302a having the smallest length required by the DVD standards and a 14T mark 302b having the longest length required by the DVD standards. Also shown are a 3T space 301b having the smallest length required by the DVD standards and a 14T space 301b having the longest length required by the DVD standards. Here, "T" is a length corresponding to 1 bit of recording information.

Figure 4:
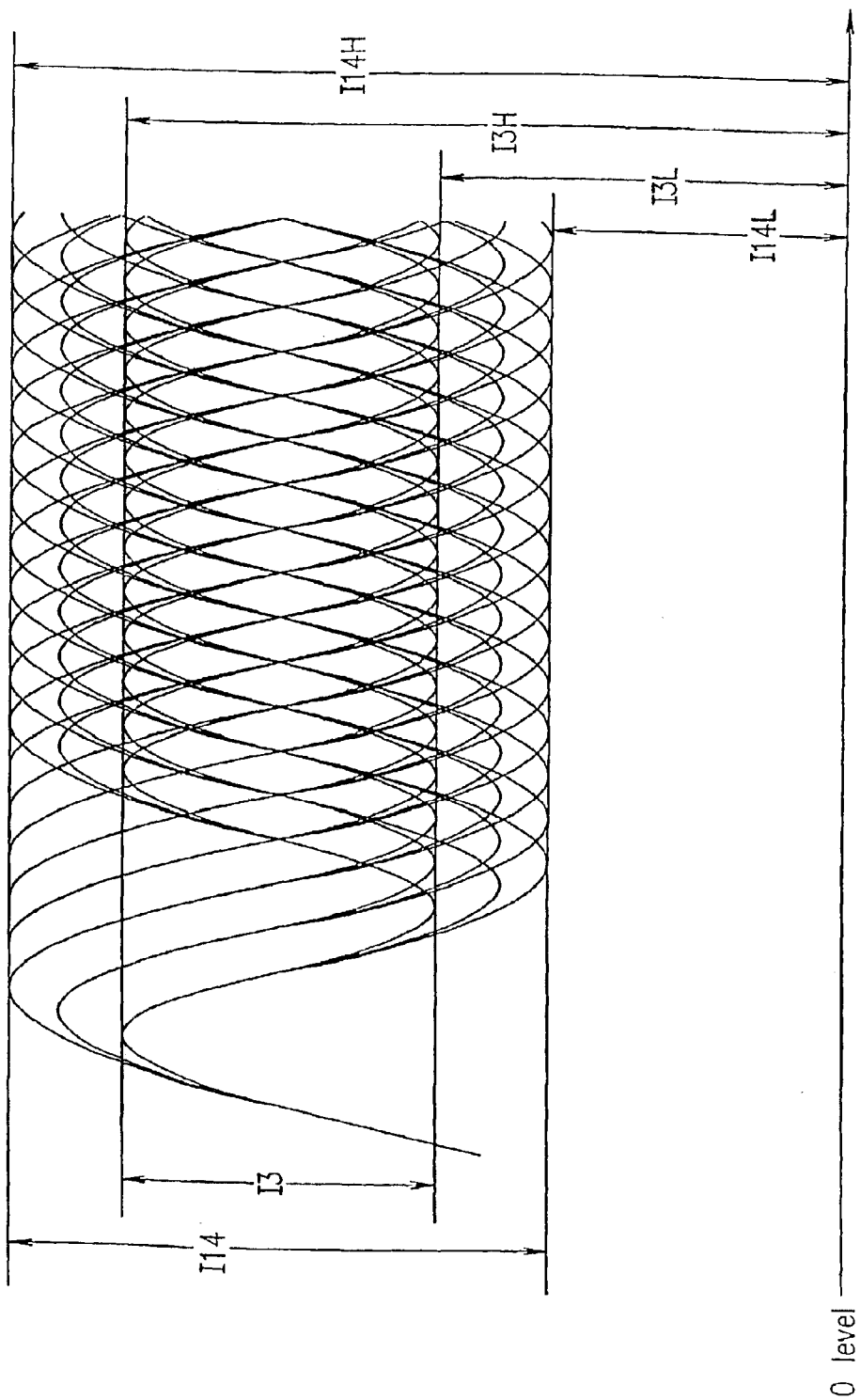
FIG. 4 is a schematic waveform diagram of a reproduction signal.

FIG. 4 shows a waveform of a signal reproduced from the optical disc. "I14H" indicates the maximum value of the amplitude (RF amplitude) of a reproduction signal having the longest pattern (including a 14T mark and a 14T space). "I14L" indicates the minimum value of the RF amplitude of the reproduction signal having the longest pattern. "I14" indicates the "magnitude" of the RF amplitude (I14H–I14L) of the reproduction signal having the longest pattern.

"I3H" indicates the maximum value of the amplitude (RF amplitude) of a reproduction signal having the shortest pattern (including a 3T mark and a 3T space). "I3L" indicates the minimum value of the RF amplitude of the reproduction signal having the shortest pattern. "I3" indicates the magnitude of the RF amplitude (I3H–I3L) of the reproduction signal having the shortest pattern.

When the information recorded in the border area 102 (FIG. 1) fulfills the following two conditions, a signal reproduced from the border area 102 is distinguishable from a signal reproduced from the unused area 101.

A first condition is that the ratio between the magnitude of the amplitude of a signal from a specific mark corresponding to the largest amplitude, among marks which can be recorded on an information recording medium, and the maximum value of the amplitude of the signal is a prescribed value or greater.

A second condition is that the signal fulfilling the first condition is generated continuously for a prescribed range.

This will be described more specifically. The specific mark corresponding to the largest amplitude, among marks which can be recorded on a DVD, is a 14T mark of the longest pattern (14T mark and 14T space). Accordingly, the first condition is that the ratio between the magnitude of the amplitude of a signal from the 14T mark (I14) and the maximum value of the amplitude of the signal (I14H), i.e., I14/I14H, is a prescribed value or greater. The prescribed value can be 0.5. Namely, the first condition can be I14/I14H≧0.5.

The second conditions is that the signal fulfilling the first condition is generated continuously for at least 4 frames.

Distinguishing information fulfilling these two conditions is recorded in the border area 102.

It should be noted that the ratio of I14/I14H can alter in accordance with, for example, recording conditions including a recording power condition and a recording pulse condition.

In the border area 102, distinguishing information can be recorded based on an optimum recording power condition obtained by recording power adjustment which is performed using the immediately previous used area. In general, a signal obtained by reproducing distinguishing information which is recorded using the optimum recording power condition is distinguishable from a reproduction signal from the unused area 101. Information recorded using the optimum recording power information can function as distinguishing information, by setting a detectable range of the RF amplitude detection processing-section in the vicinity of the optimum recording power condition.

In Example 1, a border area is located between a used area and an unused area. Using the optimum recording power condition obtained by recording power adjustment, distinguishing information which is distinguishable from the unused area by the RF amplitude detection processing section is recorded in the border area. As a result, the percentage at which the border between the used area and the unused area can be correctly distinguished in the next cycle of recording power adjustment can be improved. Accordingly, a recording power adjustment failure, such that the used area is incorrectly used in the next cycle of recording power adjustment and thus the recording power is inappropriately determined, can be avoided.

In FIG. 1, the recording power condition information is recorded on a sector-by-sector basis. The distinguishing information is recorded in the border area 102, which is formed of one sector.

Even when a plurality of sectors are used by one cycle of recording power adjustment, one sector is sufficient for the border area 102. Therefore, the number of sectors consumed by one cycle of recording power adjustment can be reduced. As a result, the number of cycles of recording power adjustment executable in the parameter calibration area 104 can be prevented from decreasing.

In the above description, the border area is formed of one sector. Example 1 is not limited to this. The border area can formed of, for example, a plurality of sectors. Alternatively, the border area can be formed of a portion of one sector, for example, four frames which is the shortest possible length to be distinguishable by the RF amplitude detection processing section.

In the above description, recording power adjustment is performed with the recording power being changed on a sector-by-sector basis. Example 1 is not limited to this. The recording power can be changed, for example, on a frame-by-frame basis, one frame being a portion of one sector.

The distinguishing information recorded in the border area used in Example 1 can be data of one cycle, or a specific pattern including 6T to 14T marks and spaces combined. A signal obtained by reproducing the distinguishing information recorded in the border area can be a signal obtained by processing random data generated from a random function with 8–16 modulation, or a signal fulfilling the relationship of $I14/I14H \geq 0.6$, which is the standard of an HF signal amplitude.

In FIG. 1, recording power adjustment is performed from the outer periphery of the parameter calibration area 104. Example 1 is not limited to this. For example, recording power adjustment can be performed from the inner periphery of the parameter calibration area 104.

In the above description, recording power adjustment is described as one example of recording condition adjustment. Recording power condition information is described as one example of recording condition information. Example 1 is not limited to recording power adjustment. Example 1 is applicable to, for example, recording pulse adjustment for obtaining a recording pulse condition.

In the above description, the distinguishing information is recorded in the border area, using the optimum recording power condition which is obtained by recording power adjustment. Example 1 is not limited to this, so long as the border area is distinguishable from an unused area.

EXAMPLE 2

In Example 2 according to the present invention, an information recording and reproduction method and an information recording and reproduction apparatus are provided for recording information on or reproducing information from the information recording medium described in Example 1.

Figure 5:
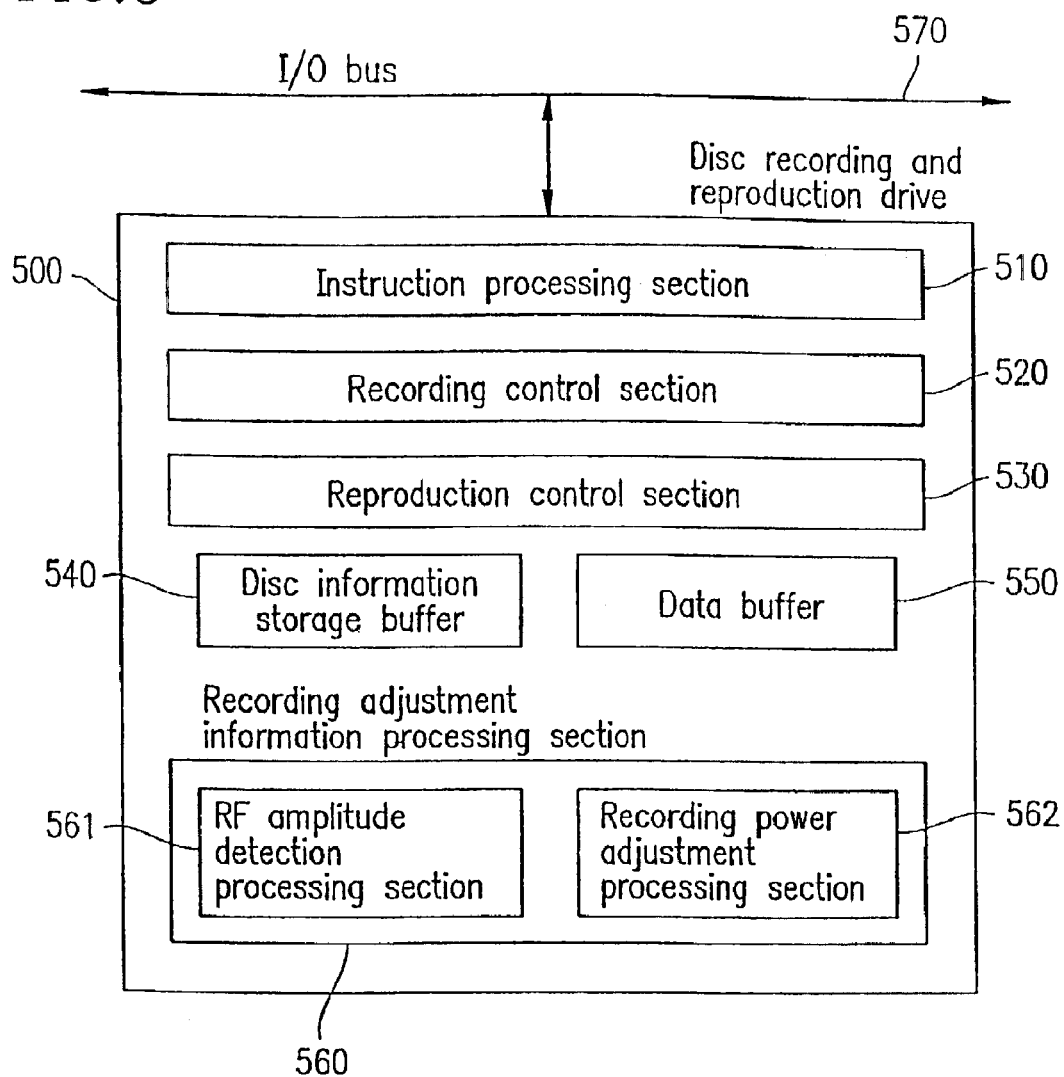
FIG. 5 shows a structure of a disc recording and reproduction drive in examples according to the present invention.

FIG. 5 is a block diagram illustrating a structure of a disc recording and reproduction drive 500 in Example 2 according to the present invention. Hereinafter, a disc on which information is recorded and from which information is reproduced by the disc recording and reproduction drive 500 will be described as a write-once type disc.

The disc recording and reproduction drive 500 is connected to an upper-stage control device (generally, a host computer) via an I/O bus 570. In terms of functions, the disc recording and reproduction drive 500 includes an instruction processing section 510 for processing an instruction from the upper-stage control device, a recording control section 520 for controlling recording of information on the write-once type discs a reproduction control section 530 for controlling reproduction of information from the write-once type disc, a disc information storage buffer 540 for storing information recorded in a RMA or a lead-in area of the write-once type disc, a data buffer 550 for temporarily storing data to be recorded or reproduced, and a recording adjustment information processing section 560 for controlling an RF amplitude detection function and/or recording power adjustment.

The recording adjustment information processing section 560 includes an RF amplitude detection processing section 561 for controlling the RF amplitude detection function and a recording power adjustment processing section 562 for controlling recording power adjustment.

Figure 6:
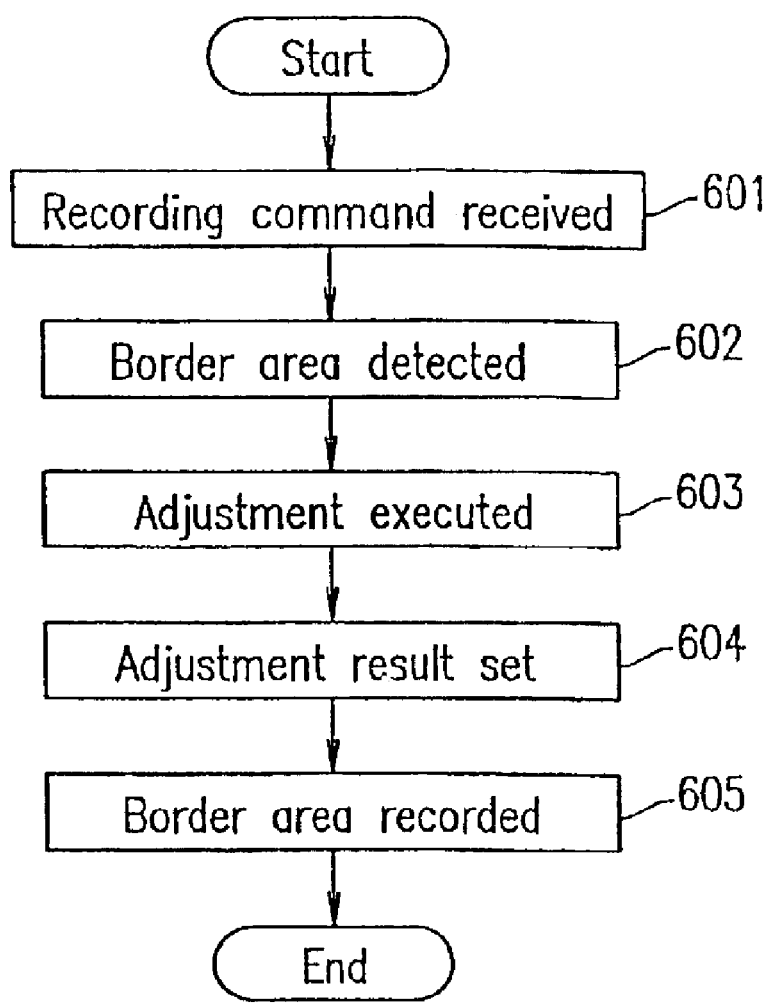
FIG. 6 is a flowchart illustrating processing of recording power adjustment in Example 2 according to the present invention.

FIG. 6 is a flowchart illustrating recording power adjustment in Example 2. The recording power adjustment is performed by the recording control section 520, the RF amplitude detection processing section 561, and the recording power adjustment processing section 562 of the disc recording and reproduction drive 500.

Upon receiving a recording command via the instruction processing section 510, the recording control section 520 stores the data to be recorded in the data buffer 550 and interrupts recording processing (step 601). Next, the RF amplitude detection processing section 561 detects a border area between a used area and an unused area and obtains a starting sector of an area to be used by recording power adjustment (step 602). The recording power adjustment processing section 562 records recording power condition information while the recording power is being changed on a sector-by-sector basis from the obtained starting sector so as to perform recording power adjustment, and thus obtains an optimum recording power condition (step 603). Then, the recording power condition obtained by the recording power adjustment is set (step 604). One sector immediately after the area used by the recording power adjustment (used area) is set as a border area, and distinguishing information which is distinguishable from the unused area by the RF amplitude detection processing section 561 is recorded in the border area (step 605).

In this manner, the border area is recorded using the recording power condition (for example, a recording power value) obtained by the recording power adjustment. As a result, the percentage at which the border between the used area and the unused area is detected by the RF amplitude detection processing section can be improved. Accordingly, a recording power adjustment failure, such that the used area is incorrectly used in the next cycle of recording power adjustment and thus the recording power is inappropriately determined, can be avoided.

In the above description, information is recorded on or reproduced from a write-once type disc. Example 2 is not limited to this. For example, information can be recorded on or reproduced from an erasable disc.

In the above description, the border area is formed of one sector. Example 2 is not limited to this. The border area can formed of, for example, a plurality of sectors. Alternatively, the border area can be formed of a portion of one sector.

In the above description, recording power adjustment is performed with the recording power being changed on a sector-by-sector basis. Example 2 is not limited to this. The recording power can be changed, for example, on a frame-by-frame basis, one frame being a portion of one sector. In the case where one or more ECC blocks are used by one cycle of recording power adjustment, among sectors included in the ECC block used by recording power adjustment, a sector adjacent to the ECC block which is not used by the recording power adjustment can be set as a border area so as to manage the used area on a block-by-block basis.

The distinguishing information recorded in the border area used in Example 2 can be data of one cycle, or a specific pattern including 6T to 14T marks and spaces combined. A signal obtained by reproducing the distinguishing information recorded in the border area can be a signal obtained by processing random data generated from a random function with 8–16 modulation, or a signal fulfilling the relationship of I14/I14H≧0.6, which is the standard of an HF signal amplitude.

In the above description, recording power adjustment is described as one example of recording condition adjustment. Example 2 is not limited to recording power adjustment. Example 2 is applicable to, for example, recording pulse adjustment for obtaining a recording pulse condition.

EXAMPLE 3

In Example 3 according to the present invention, an information recording and reproduction method and an information recording and reproduction apparatus are provided for detecting a border area between a used area and an unused area in the information recording medium described in Example 1 using an RF amplitude detection processing section so as to distinguish the used area from the unused area. Thus, incorrect detection of the border can be avoided.

As described in Example 1, the border area is located to be in contact with the unused area. In the following description, it is assumed that the parameter calibration area is used from an outer periphery to an inner periphery.

The border area will be detected using the RF amplitude detection processing section as follows. When detection is performed from an innermost portion of the parameter calibration area, an area in which the RF amplitude is detected continuously for a prescribed range or more is determined to be the border area. However, this technique requires most of the entire parameter calibration area to be checked in the case where most of the parameter calibration area is unused, i.e., in the case where the ratio of the unused area with respect to the entire parameter calibration area is high. As a result, detection of the border area requires an extended period of time.

In addition, in the case where a reproduction signal is detected from the outer periphery of the parameter calibration area until the unused area is detected, or in the case where an area in which information is recorded using recording power which is too small to be detected by the RF amplitude detection processing section is continued for a prescribed range or more, there is a possibility that the area is incorrectly detected as the unused area. This has a significant influence on the precision of recording power adjustment.

Accordingly, in Example 3, when recording power condition information is recorded by recording power adjustment, one signal which is distinguishable from the unused area is recorded in each of prescribed ranges so as to solve the above problem.

Figure 7A:
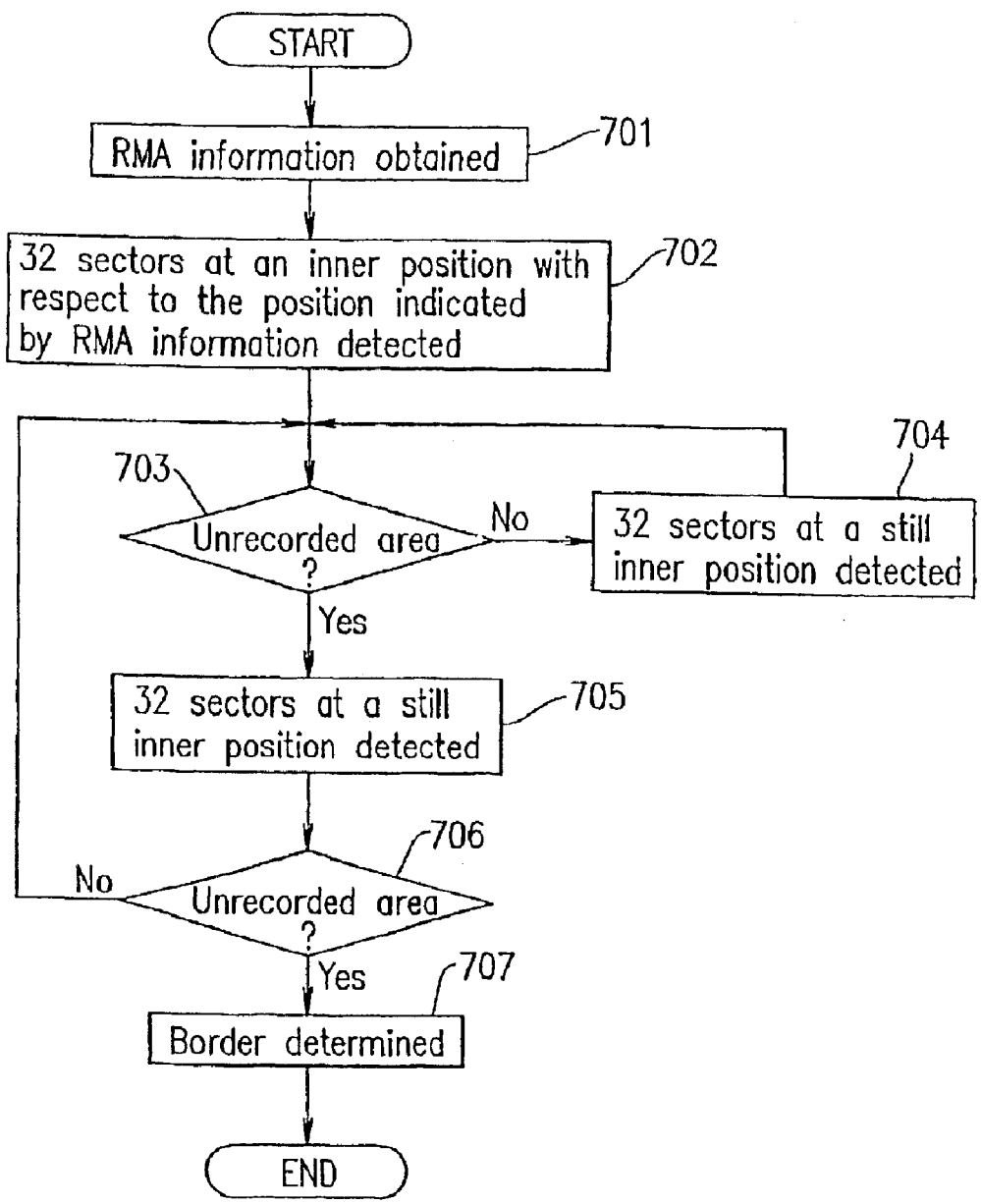
FIG. 7A is a flowchart illustrating processing for detecting a border between a used area and an unused area in Example 3 according to the present invention.

FIG. 7A is a flowchart illustrating processing for detecting a border between a used area and an unused area in Example 3. The detection of the border is performed by the RF amplitude detection processing section 561 (FIG. 5). In FIG. 7A, the parameter calibration area is assumed to be used from the outer periphery thereof.

For recording power adjustment, the RF amplitude detection processing section 561 acquires information regarding the border which is recorded in the RMA (step 701). Then, the RF amplitude detection processing section 561 detects an area of a prescribed range (for example, 32 sectors), in the parameter calibration area, which is at an inner position with respect to a position indicated by the information regarding the border which is recorded in the RMA (step 702). The area detected in step 702 can include the position indicated by the information regarding the border which is recorded in the RMA. Based on the detection in step 702, it is determined whether or not there is a continuous unrecorded area of, for example, one sector or more in the area detected in step 702 (step 703).

When it is determined that there is no continuous unrecorded area of one sector or more, i.e., when it is determined that at least one sector in the area detected in step 702 is already used for recording ("No" in step 703), another area of 32 sectors which is at a further inner position to the area detected in step 702 is detected (step 704). Then, the processing returns to step 703, where it is determined whether or not there is a continuous unrecorded area of one sector or more in the area detected in step 704.

When it is determined that there is a continuous unrecorded area of one sector or more, i.e., when it is determined there is a border between a recorded area and an unrecorded area in the area detected in step 702 ("Yes" in step 703), still another area of 32 sectors which is at a further inner position with respect to the area detected in step 702 is detected(step 705). It is determined whether or not there is a continuous unrecorded area of one sector or more in the area detected in step 705 (step 706). When it is determined that all of the 32 sectors in the area detected in step 705 are unrecorded sectors ("Yes" in step 706), the border between the unrecorded area and the recorded area, which is determined to exist in step 703, is determined to be the border between the used area and the unused area (step 707). When it is determined that at least one sector of the 32 sectors in the area detected in step 705 is a recorded sector ("No" in step 706), there is a possibility that there is still a recorded area in an area which is at an inner position with respect to the area detected in step 705. Therefore, the processing returns to step 703.

When a border between a used area and an unused area is detected in this manner, information which is distinguishable from the unused area by the RF amplitude detection processing section can be recorded at least in each of the prescribed ranges (in the above example, 32 sectors). Thus, the border area can be detected with certainty. Especially because the detection can be performed from the outer periphery of the parameter calibration area, which is used before the inner periphery, a time period required for the detection can be reduced.

Alternatively, dummy information recognized as a dummy of the border area can be recorded in a dummy area. At least one dummy area can be in each of the prescribed ranges in the used area of the parameter calibration area.

FIG. 713 shows a structure of a parameter calibration area 714 and a change in the magnitude of an amplitude of reproduction signal obtained when the data in the parameter calibration area 714 is reproduced in Example 3 according to the present invention. The parameter calibration area 714 includes an unused area 711, a used area 713, and a border area 712 located between the unused area 711 and the used area 713. In FIG. 7B, recording power condition information 715 is recorded in the used area 713 from an outer periphery thereof.

The border area 712 is for recording distinguishing information for distinguishing a border between the unused area 711 and the used area 713, and a plurality of dummy areas 717 are for recording dummy information which is recognized as a dummy of the border area 712 by the RF amplitude detection processing section 561. A distance between two adjacent dummy areas 717 and a distance between a dummy area 717 and the border area 712 are each a prescribed distance (for example, 32 sectors) or less. In FIG. 7B, the amplitude of the reproduction signal of the used area 713 is shown as being too small to be detectable except for the dummy areas 717. The level of the amplitude of the reproduction signal is not limited to this.

In this case, even when the used area 713 includes a great number of areas in which recording power which is too small to be detected by the RF amplitude detection processing section 561 is recorded, such areas are prevented from being incorrectly detected as unused areas. The dummy information recorded in the dummy areas can be equivalent with information distinguishable by the RF amplitude detection processing section 561.

The incorrect detection of the used area 713 of an information recording medium as an unused area can be avoided by providing the dummy areas 717 and the border area 712 in the parameter calibration area.

In the above description, the detection is performed on a basis of 32 sectors. Example 3 is not limited to this. For example, a greater number of sectors can be detected at once. Alternatively, a greater number of sectors are detected in step 702 and step 704 (FIG. 7A). In this case, where the unrecorded area exists can be predicted in a shorter time period, and more detailed detection can be performed in step 705.

In the above description, detection is performed from an outer periphery to an inner periphery. Example 3 is not limited to this. For example, detection can be performed for an area between the position of the border which is recorded in the RMA and the innermost periphery using a binary search technique or the like. In this manner, the time period required for the detection can be reduced even when most of the parameter calibration area is used.

In the above description, the detection is performed on a sector-by-sector basis. Example 3 is not limited to this. For example, the detection can be performed on a basis of four frames, which is the shortest possible unit distinguishable by the RF amplitude detection processing section.

In the above description, recording power adjustment is described. Example 3 is not limited to this. Example 3 is applicable to, for example, recording pulse adjustment for obtaining a recording pulse condition.

EXAMPLE 4

In Example 4 according to the present invention are an information recording and reproduction method and an information recording and reproduction apparatus are provided for recording information in a used area adjacent to an unused area, using a recording power indicated by the information stored in an optical disc. In Example 4, recording condition information functions as distinguishing information for distinguishing a border between a used area and an unused area. Alternatively, when the recording condition information is determined not to function as the distinguishing information, a border area for recording the distinguishing information is provided at the border between the used area and the unused area.

The disc recording and reproduction drive in Example 4 is shown in FIG. 5. The structure is the same as that described in Example 2 and will not be described here.

Figure 8:
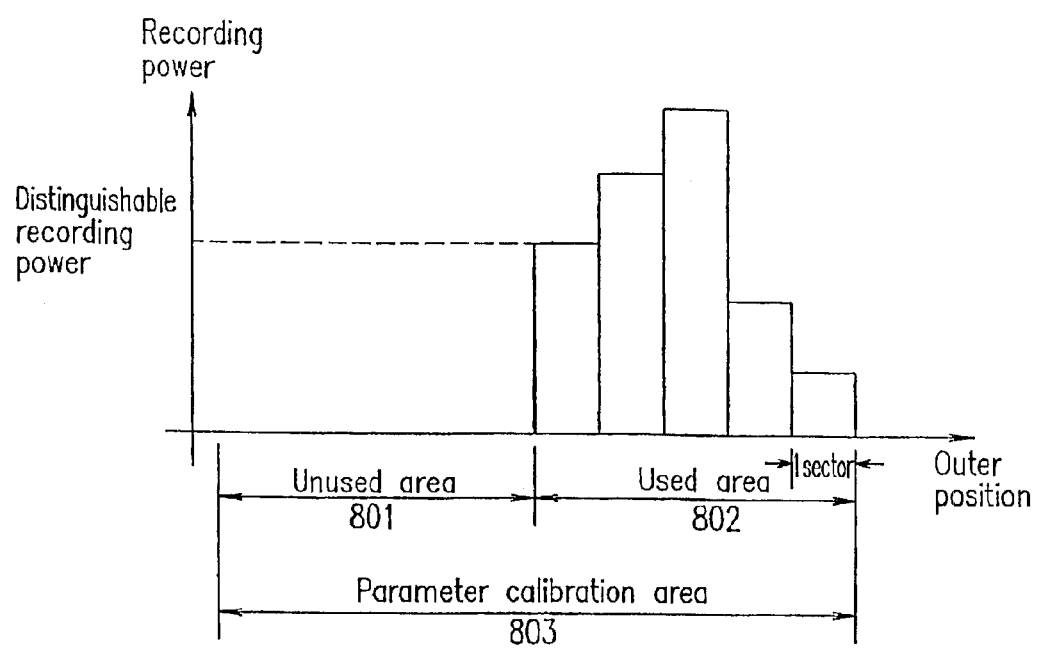
FIG. 8 shows a structure of a parameter calibration area and a change in a recording power in Example 4 according to the present invention.

FIG. 8 shows a structure of a parameter calibration area 803 and a change in a recording power for recording information in each sector in Example 4 according to the present invention. The parameter calibration area 803 includes a used area 802 already used by recording power adjustment and an unused area 801 not yet used by recording power adjustment.

Figure 9A:
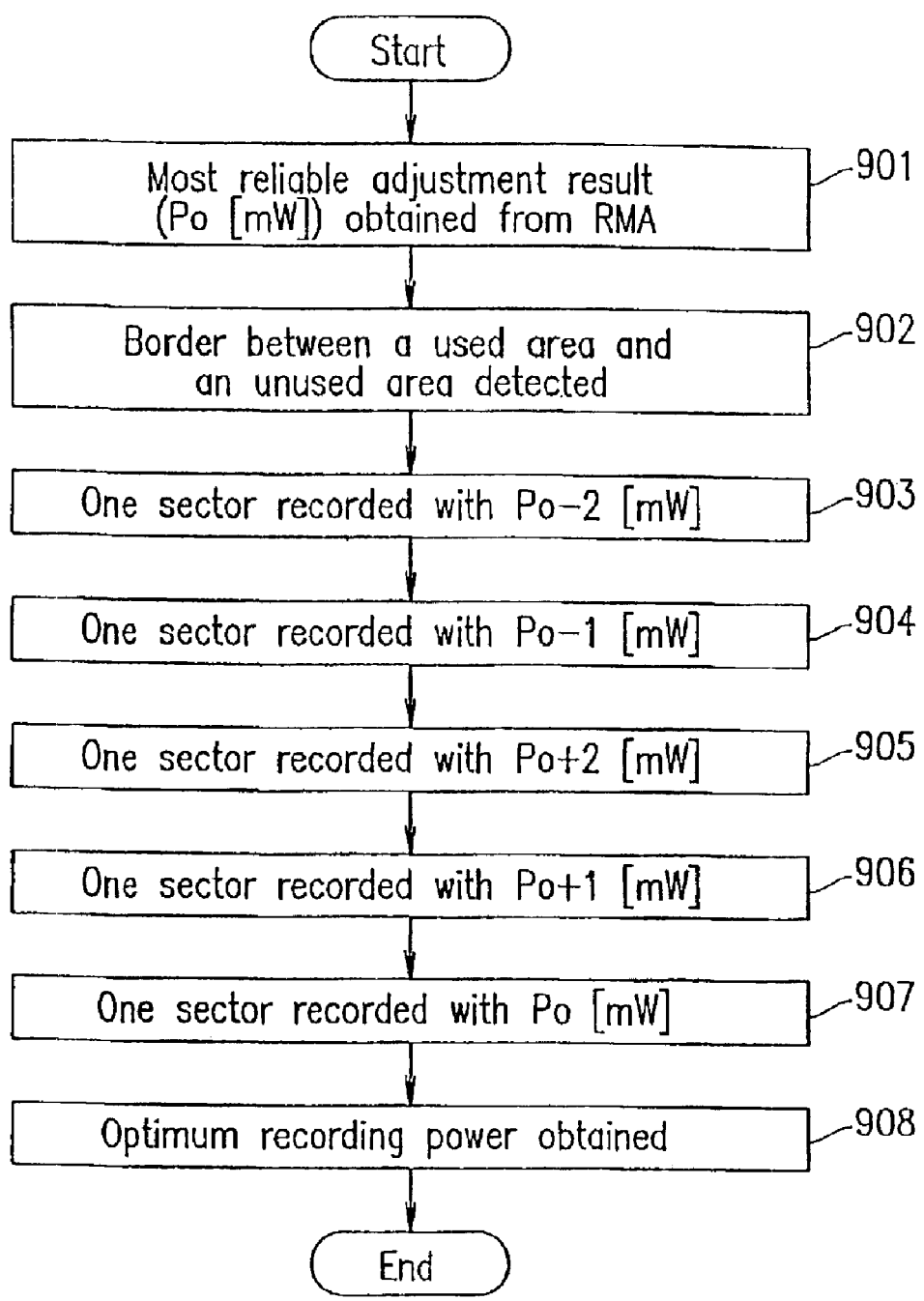
FIG. 9A is a flowchart illustrating processing of recording power adjustment in Example 4.

FIG. 9A is a flowchart illustrating recording power adjustment in Example 4. The recording power adjustment is performed by the recording control section 520, the reproduction control section 530, the RF amplitude detection processing section 561, and the recording power adjustment processing section 562 of the disc recording and reproduction drive 500 shown in FIG. 5. In the following description, it is assumed that the most reliable recording power value is the optimum recording power and functions as distinguishing information for detecting a border between the used area 802 and the unused area 801.

Before executing recording power adjustment, the reproduction control section 530 obtains, from the RMA, information regarding the adjustment result of recording power adjustment previously performed which is stored in the disc, and stores the information in the disc information storage buffer 540. The recording power adjustment control section 562 selects a recording power value which is most reliable from the information stored in the disc information storage buffer 540 (hereinafter, the selected recording power value will be represented as Po[mW]) (step 901). Next, the RF amplitude detection processing section 561 detects the border between the used area 802 and the unused area 801, and obtains the starting sector of an area to be used by recording power adjustment (step 902). Then, the recording power adjustment processing section 562 sequentially records recording power condition information on a sector-by-sector basis from the obtained starting sector, using recording power values (Po−2)[mW], (Po−1) [mW], (Po+2) [mW], (Po+1)[mW], and Po[mW] (steps 903 through 907). Finally, the recording power condition information in each sector is reproduced. The recording power value corresponding to the sector having the best reproduction state is adopted as the adjustment result (step 908). Thus, the recording power adjustment is completed.

In Example 4, information is recorded in a sector adjacent to the unused area in the parameter calibration area to be used by recording power adjustment using the most reliable recording power adjustment result among the recording power adjustment previously obtained. In this manner, the percentage at which the border between the used area and the unused area is successfully detected by the RF amplitude detection processing section can be improved. That is, the most reliable recording power adjustment result functions as distinguishing information. Accordingly, the border area described in Example 1 is not necessary. Therefore, an area in the parameter calibration area consumed by one cycle of recording power adjustment can be reduced. Thus, the number of cycles of recording power adjustment executable in the parameter calibration area can be increased.

In the above description, recording power adjustment is performed with the recording power being changed on a sector-by-sector basis. Example 4 is not limited to this. The recording power can be changed, for example, on a frame-by-frame basis, one frame being a portion of one sector.

In the above description, the recording power value is changed by 1 [mW] on a sector-by-sector basis. Example 4 is not limited to this. For example, the recording power value can be changed by 0.5 [mW]. The recording power value can be changed in a different manner.

In the above description, the most reliable recording power value is obtained from the RMA. Example 4 is not limited to this. For example, an LPP (Land Pre-Pit) stores a recording power value defined by the manufacturer of the disc as being suitable to the disc. Such information can be used.

In the above description, it is assumed that the most reliable recording power value is the optimum recording power condition and functions as distinguishing information for detecting a border between the used area and the unused area. However, there can be a case where the recording power value recorded in the RMA is not determined as being the optimum recording power condition.

Figure 9B:
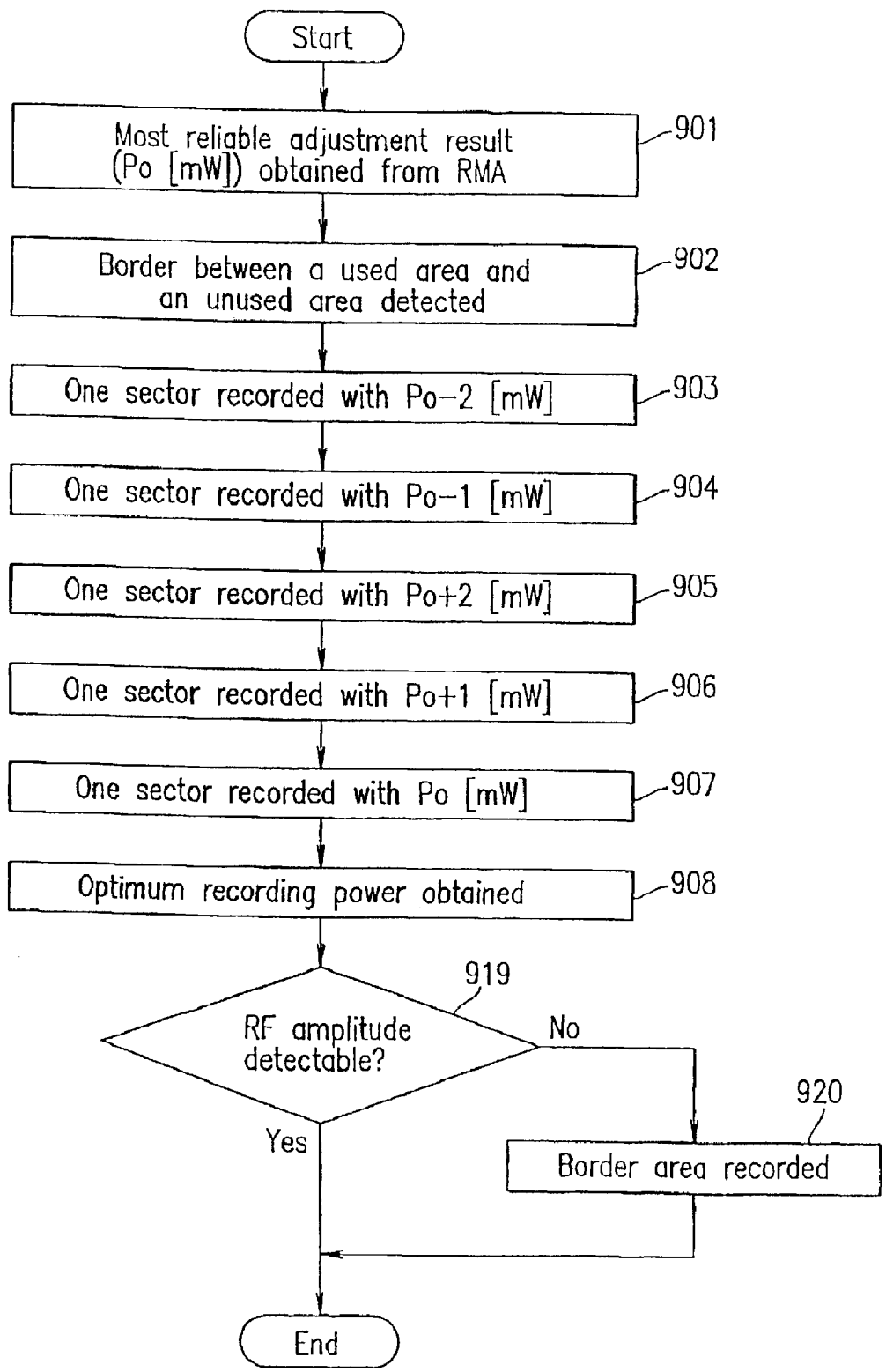
FIG. 9B is a flowchart illustrating processing of recording power adjustment in a modification of Example 4.

FIG. 9B is a flowchart illustrating recording power adjustment according to a modification of Example 4. Steps 901 through 908 are the same as those in FIG. 9A and will not described again. In step 919, it is determined whether or not the recording power condition information, recorded using the recording power value recorded in the RMA, can be detected by the RF amplitude detection processing section 561. When it is determined that the recording power condition information, recorded using the recording power value cannot be detected ("No" in step 919), a border area is provided between the used area and the unused area, and the recording power adjustment result is used to record distinguishing information which is distinguishable from the unused area by the RF amplitude detection processing section 561 (step 920). When it is determined that the recording power condition information, recorded using the recording power value can be detected ("Yes" in step 919), the recording power adjustment is completed. In this manner, the possibility that the border can be correctly detected in the next cycle of recording condition adjustment can be improved.

In FIG. 8, the recording power condition information for performing recording power adjustment is recorded from the outer periphery of the parameter calibration area 803. Example 4 is not limited to this. The recording power adjustment can be performed from the inner periphery of the parameter calibration area 803.

In the above description, recording power adjustment is performed. Example 4 is not limited to this. For example, Example 4 is applicable to recording pulse adjustment for obtaining a recording pulse condition.

In the above description, the border area is recorded based on whether or not the recording power condition information, recorded using the recording power value recorded in the RMA, can be detected by the RF amplitude detection processing section. Example 4 is not limited to this. For example, the border area can be recorded based on whether or not the recording power value recorded in the RMA is equal to the optimum recording power value.

EXAMPLE 5

In Example 5 according to the present invention, an information recording and reproduction method and an information recording and reproduction apparatus are provided for recording information on or reproducing information from the information recording medium described in Example 1. In Example 5, information for allowing a recording condition to be obtained based on a second determination criterion, which is different from a first determination criterion used in Example 4 for obtaining the optimum recording condition is recorded as distinguishing information.

The disc recording and reproduction drive in Example 5 is shown in FIG. 5. The structure is the same as that described in Example 2 and will not be described here.

Figure 10:
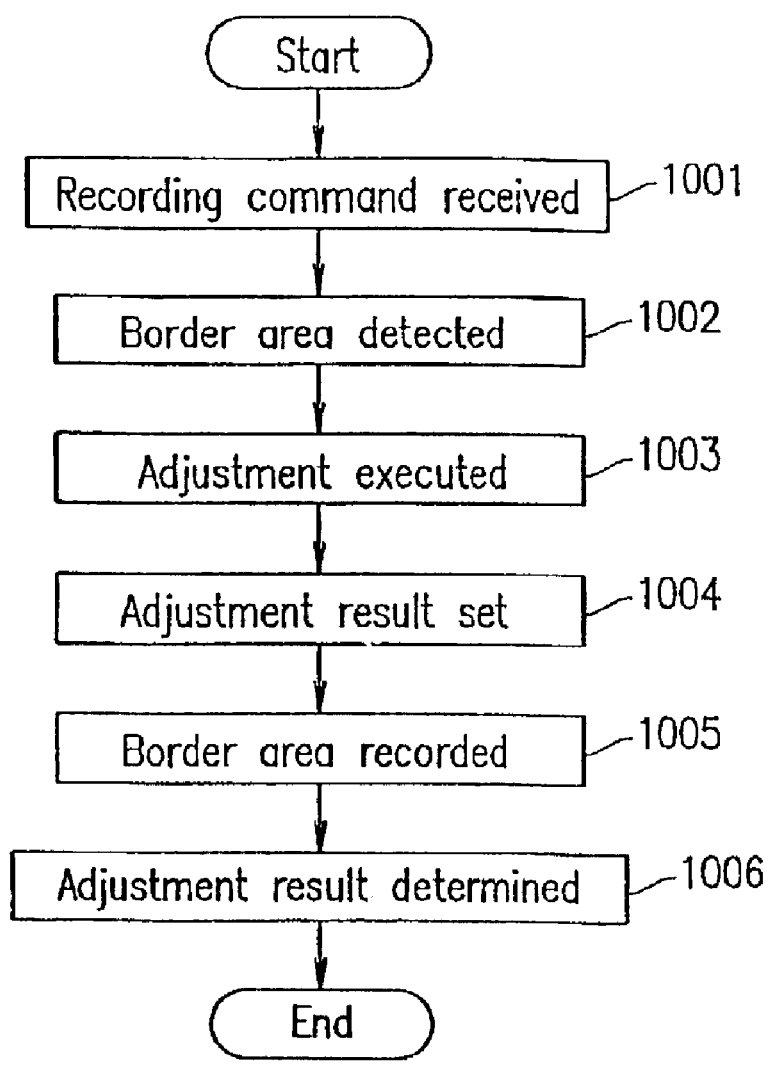
FIG. 10 is a flowchart illustrating processing of recording power adjustment in Example 5 according to the present invention.

FIG. 10 is a flowchart illustrating recording power adjustment in Example 5. The recording power adjustment is performed by the recording control section 520, the reproduction control section 530, the RF amplitude detection processing section 561, and the recording power adjustment processing section 562 of the disc recording and reproduction drive 500 shown in FIG. 5. The criteria for selecting the optimum recording power by the recording power adjustment processing section 562 includes BER (Byte Error Rate), "jitter" indicating the time offset between a reproduction signal and a source signal, and "asymmetry" indicating the degree of asymmetry of the reproduction signal.

Steps 1001 and 1002 are the same as steps 601 and 602 shown in FIG. 6 and will not described here.

The recording power adjustment processing section 562 performs recording power adjustment from the obtained starting sector, and selects an optimum recording power value using the asymmetry (a first determination criterion) (step 1003). Next, the recording power value obtained in the recording power adjustment is set (step 1004). One sector which is next to the area used by the recording power adjustment (used area) is set as a border area. In the border area, distinguishing information which is distinguishable from the unused area by the RF amplitude detection processing section and can be processed with BER measurement (a second determination criterion) is recorded (step 1005). Then, the distinguishing information recorded in the border area is measured by BER, thereby determining whether or not the recording power obtained by recording power adjustment is also optimum with respect to BER (step 1006).

In Example 5, a signal suitable for the second determination criterion, which is different from the first determination criterion used by recording power adjustment, is recorded in the border area as distinguishing information with a recording power value obtained by recording power adjustment, and the recording state thereof is determined. Thus, the reliability of the recording power value obtained by recording power adjustment can be improved.

In the above description, the border area is formed of one sector. Example 5 is not limited to this. The border area can formed of, for example, a plurality of sectors. Alternatively, the border area can be formed of a portion of one sector.

In the above description, recording power adjustment is performed with the recording power being changed on a sector-by-sector basis. Example 5 is not limited to this. The recording power can be changed, for example, on a frame-by-frame basis, one frame being a portion of one sector.

In the above description, asymmetry is used as the first determination criterion to perform recording power adjustment, and the information recorded in the border area is determined using BER as the second determination criterion. Example 5 is not limited to this. For example, BER can be used as the first determination criterion to perform recording power adjustment, and the information recorded in the border area can be determined using jitter as the second determination criterion. Alternatively, the information recorded in the border area can be determined the second time using the same determination criterion as used for recording power adjustment.

In the above description, recording power adjustment is performed as one example of recording condition adjustment. Example 5 is not limited to this. For example, Example 5 is applicable to recording pulse adjustment for obtaining a recording pulse condition.

It can be determined whether or not the recording condition information recorded in the border area adjacent to the unused area functions as distinguishing information. When it is determined that the recording condition information does not function as the distinguishing information, another border area can be recorded in an area at an inner position with respect to the border area. Thus, the possibility that the border can be correctly detected in the next cycle of recording condition adjustment can be improved.

In addition, it can be determined whether or not the innermost area is suitable as the border area. When the innermost area is determined to be unsuitable, a border area can be recorded in an area at an inner position with respect to the innermost area. Thus, the possibility that the border can be correctly detected in the next cycle of recording power adjustment can be improved.

EXAMPLE 6

In Example 6 according to the present invention, an information recording and reproduction method and an information recording and reproduction apparatus are provided for determining whether or not distinguishing information should be recorded based on the recording state of an area (adjacent to the unused area) used by recording power adjustment.

The disc recording and reproduction drive in Example 6 is shown in FIG. 5. The structure is the same as that described in Example 2 and will not be described here.

Figure 11:
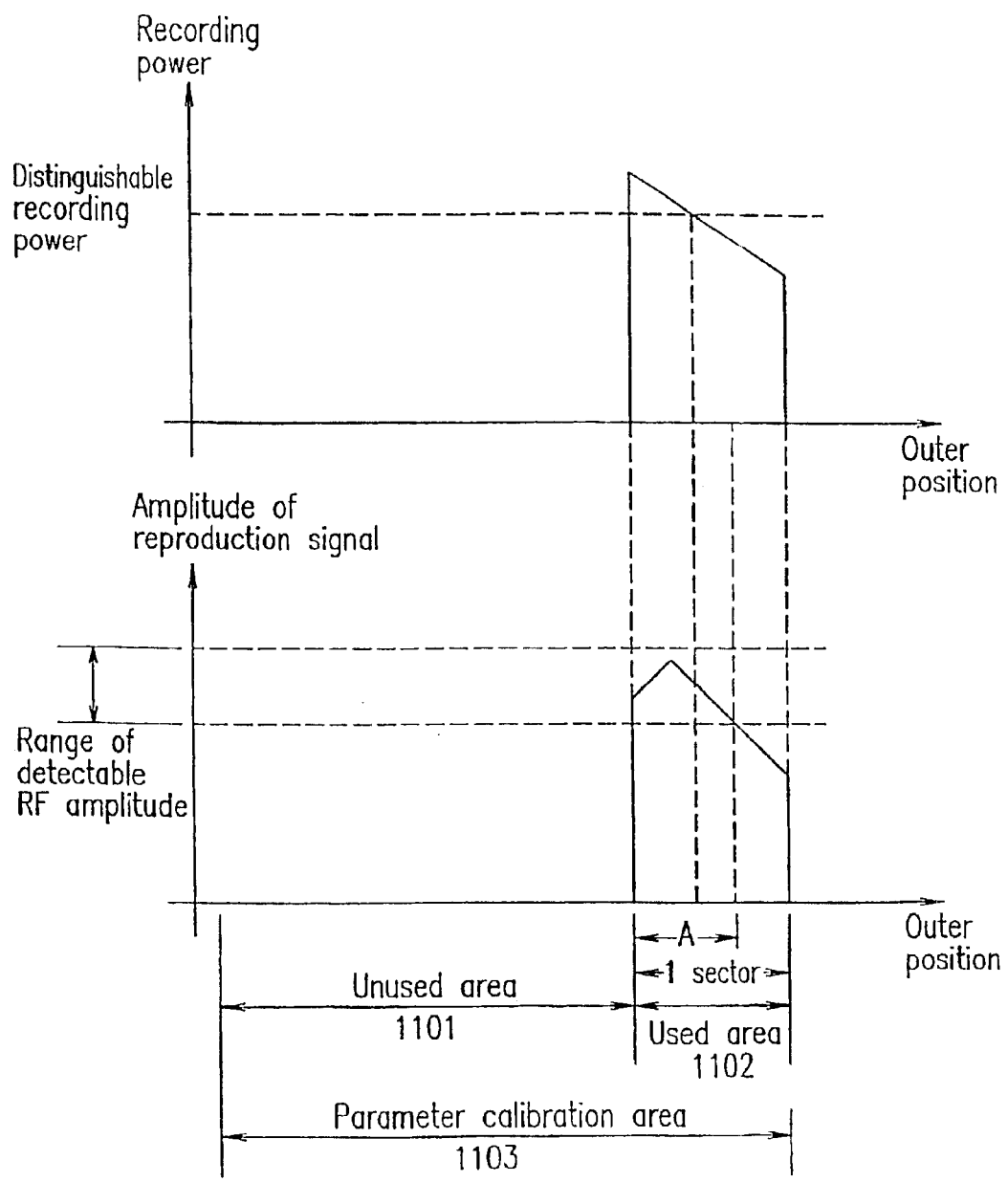
FIG. 11 shows a structure of a parameter calibration area, a change in a recording power for recording information in each sector, and an amplitude of a reproduction signal when reproducing a recorded signal in Example 6 according to the present invention.

FIG. 11 shows a structure of a parameter calibration area 1103, a change in a recording power for recording information in each sector, and a change in the amplitude of a reproduction signal when the recorded signal is reproduced in Example 6. The parameter calibration area 1103 includes a used area 1102 used by recording power adjustment and an unused area 1101 not yet used by recording power adjustment.

Figure 12:
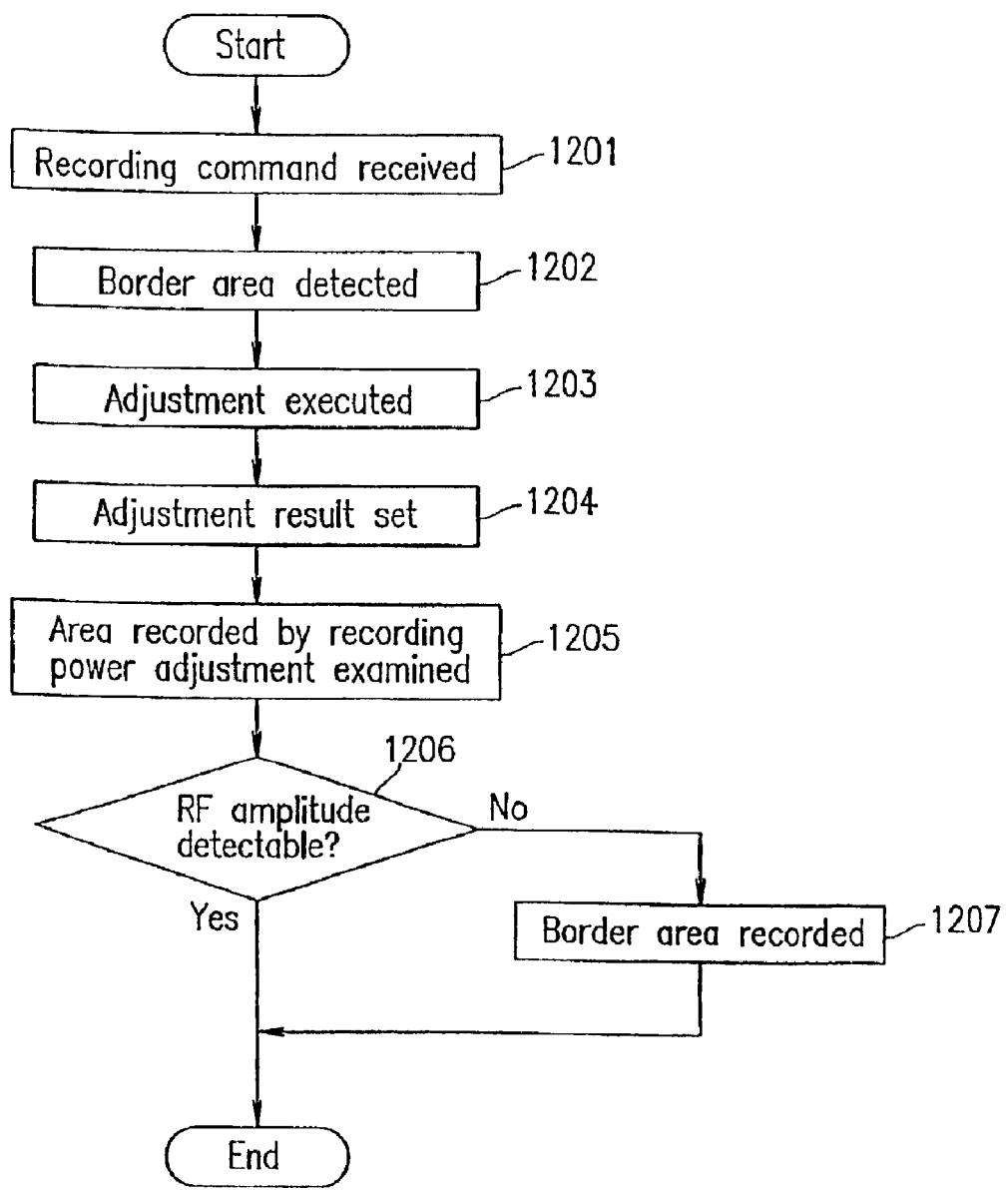
FIG. 12 is a flowchart illustrating processing of recording power adjustment in Example 6.

FIG. 12 is a flowchart illustrating recording power adjustment in Example 6. The recording power adjustment is performed by the recording control section 520, the reproduction control section 530, the RF amplitude detection processing section 561, and the recording power adjustment processing section 562 of the disc recording and reproduction drive 500 shown in FIG. 5.

Steps 1201 and 1202 are the same as steps 601 and 602 shown in FIG. 6 and will not described here.

The recording power adjustment processing section 562 performs recording power adjustment from the obtained starting sector, and selects an optimum recording power value (step 1203). The recording power adjustment is performed to an area of one sector, and the recording power is raised on a frame-by-frame basis. One sector includes a plurality of frames. Also in the recording power adjustment, a signal distinguishable from the unused area by the RF amplitude detection processing section is recorded. After the optimum recording power value obtained by the recording power adjustment is set (step 1204), the one-sector area which is adjacent to the unused area and is used by recording power adjustment is measured so as to obtain the size of an area in which a signal having a detectable RF amplitude is recorded (step 1205) When the size of the area is sufficiently large (as indicated by "A" in FIG. 11) ("Yes" in step 1206), i.e., the RF amplitude is detectable with certainty, no border area is recorded. When the size of the area is not sufficiently large ("No" in step 1206), the one-sector area which is adjacent to the area used by the recording power adjustment is set as a border area, and a signal distinguishable from the unused area by the RF amplitude detection processing section is recorded in the border area.

In Example 6, a signal distinguishable from the unused area by the RF amplitude detection processing section is recorded by recording power adjustment. The area in which the signal is recorded is measured so as to obtain the size of the area in which a signal having a detectable RF amplitude is recorded. When the area is sufficiently large, no border area is recorded. Thus, the number of sectors consumed by one cycle of recording power adjustment can be reduced. As a result, the number of cycles of recording power adjustment executable in the parameter calibration area can be increased.

In the case where, in step 1206, the area recording a signal having a detectable RF amplitude ("A" in FIG. 11) includes at least four frames, such an area is distinguishable by the RF amplitude detection processing section. Therefore, it is not necessary to record the distinguishing information in the border area.

In the above description, the border area is formed of one sector. Example 6 is not limited to this. The border area can formed of, for example, a plurality of sectors. Alternatively, the border area can be formed of four frames, which is the minimum possible unit distinguishable by the RP amplitude detection processing section.

In the above description, recording power adjustment is performed with the recording power being changed on a frame-by-frame basis. Example 6 is not limited to this. The recording power can be changed, for example, on a sector-by-sector basis. The area which is adjacent to the unused area and is used by recording power adjustment can be measured so as to obtain the size of an area in which a signal having a detectable RF amplitude is recorded.

The recording power condition information functioning as distinguishing information or the distinguishing information recorded in the border area in Example 6 can be data of one cycle, or a specific pattern including 6T to 14T marks and spaces combined. A signal reproduced from the recording power condition information functioning as distinguishing information or from the distinguishing information recorded in the border area can be a signal obtained by processing random data generated from a random function with 8-16 modulation, or a signal fulfilling the relationship of $I14/I14H \geqq 0.6$, which is the standard of an HF signal amplitude.

In FIG. 11, recording power adjustment is performed from the outer periphery of the parameter calibration area. Example 6 is not limited to this. For example, recording power adjustment is performed from the inner periphery of the parameter calibration area.

In the above description, recording power adjustment is performed as one example of recording condition adjustment. Example 6 is not limited to this. For example, Example 6 is applicable to recording pulse adjustment for obtaining a recording pulse condition.

INDUSTRIAL APPLICABILITY

According to an information recording medium of the present invention, a border area is provided between a used area and an unused area. Distinguishing information which is distinguishable from the unused area by an RF amplitude detection processing section is recorded in the border area. The distinguishing information can use a recording power condition obtained by recording power adjustment. Thus, the percentage at which the border between the used area and the unused area is correctly detected by the RF amplitude detection processing section in the next cycle of recording power adjustment can be improved. In addition, an area in the parameter calibration area consumed by one cycle of recording power adjustment can be reduced. Thus, the number of cycles of recording power adjustment executable in the parameter calibration area can be increased.

According to an information recording and reproduction method of the present invention, the border area is recorded using the recording power value obtained by recording power adjustment. Therefore, the percentage at which the border between the used area and the unused area is correctly detected by the RF amplitude detection processing section in the next cycle of recording power adjustment can be improved.

According to an information recording and reproduction method of the present invention, an area closest to the unused area in the parameter calibration area used by recording power adjustment is recorded using the most reliable previous recording power adjustment result. Therefore, the percentage at which the border between the used area and the unused area is correctly detected by the RF amplitude detection processing section in the next cycle of recording power adjustment can be improved. Additionally, an area in the parameter calibration area consumed by one cycle of recording power adjustment can be reduced. Thus, the number of cycles of recording power adjustment executable in the parameter calibration area can be prevented from decreasing. Alternatively, it can be determined whether or not the previous recording power adjustment result is suitable as distinguishing information In such a case, only when the previous recording power adjustment result is determined not to be suitable, distinguishing information can be recorded. When the previous recording power adjustment result is determined to be suitable as the distinguishing information, the border area for recording the distinguishing information is not required to be provided. Thus, the parameter calibration area can be effectively used.

According to an information recording and reproduction method of the present invention, the recording power obtained by recording power adjustment using the border area can be determined using a determination criterion which is different from a determination criterion used by recording power adjustment. Thus, the reliability of the recording power value obtained by recording power adjustment can be improved.

According to an information recording and reproduction method of the present invention, a signal distinguishable from an unused area by the RF amplitude detection processing section is recorded by recording power adjustment. It is determined whether or not an RF amplitude is detectable in area in which the signal is recorded. When the RF amplitude is determined to be detectable, no border area is provided. Therefore, an area in the parameter calibration area consumed by one cycle of recording power adjustment can be reduced. Thus, the number of cycles of recording power adjustment executable in the parameter calibration area can be prevented from decreasing.

What is claimed is:

1. An information recording medium, comprising:
a data recording area for recording data; and
a parameter calibration area for recording recording condition information,
wherein the parameter calibration area includes:
a used area having the recording condition information recorded therein,
an unused area having no recording condition information, and
a border area for recording distinguishing information for distinguishing a border between the used area and the unused area, and
wherein the border area is between the used area and the unused area.

2. An information recording medium according to claim 1, wherein the recording condition obtained based on a reproduction state of the recording condition information defines an operation condition of an information recording and reproduction apparatus capable of mounting the information recording medium, the operation condition being used when the information recording and reproduction apparatus records data.

3. An information recording medium according to claim 1, wherein the information recording medium is of a write-once type.

4. An information recording medium according to claim 1, wherein the distinguishing information includes a plurality of marks and a plurality of spaces.

5. An information recording medium according to claim 4, wherein the ratio of a magnitude of an amplitude of a signal, corresponding to a longest pattern including a longest mark among the plurality of marks and a longest space among the plurality of spaces, and a maximum value of the amplitude is at least a prescribed value.

6. An information recording medium according to claim 5, wherein the prescribed value of 0.5.

7. An information recording medium according to claim 5, wherein the signal is continuous for at least four frames.

8. An information recording medium according to claim 1, wherein the border area includes at least one sector.

9. An information recording medium according to claim 4, wherein the plurality of marks are recorded as an optimum piece of recording and reproduction condition information among the recording and reproduction condition information.

10. An information recording medium according to claim 1, wherein:
the parameter calibration area further includes a plurality of dummy areas for recording dummy information which is recognized as a dummy of the border area, and
a distance between two adjacent areas among the border area and the plurality of dummy areas is a prescribed value or less.

11. An information recording medium according to claim 10, wherein the prescribed value is 32 sectors.

12. An information recording and reproduction method used for an information recording medium including a data recording area for recording data and a parameter calibration area for recording recording condition information, the method comprising the steps of:
(a) recording the recording condition information in a portion of the parameter calibration area;
(b) obtaining an optimum recording condition based on a reproduction state of the recording condition information recorded in the portion of the parameter calibration area; and
(c) recording distinguishing information for distinguishing a border between a used area and an unused area in the parameter calibration area, the distinguishing information being recorded in a border area located between the used area and the unused area, the used area having the recording condition information recorded therein and the unused area having no recording condition information.

13. An information recording and reproduction method according to claim 12, wherein the recording condition obtained based on the reproduction state of the recording condition information defines an operation condition of an information recording and reproduction apparatus capable of mounting the information recording medium, the operation condition being used when the information recording and reproduction apparatus records data.

14. An information recording and reproduction method according to claim 12, wherein step (a) includes the step of detecting a border between an area having the recording condition information recorded therein and an area having no recording condition information, and recording the recording condition information in the area having no recording condition information in a direction from the border, both of the areas being in the parameter calibration area.

15. An information recording and reproduction method according to claim 12, wherein step (c) includes the step of recording the distinguishing information based on the optimum recording condition.

16. An information recording and reproduction method according to claim 12, wherein step (c) includes the step of recording information, capable of obtaining the recording condition based on a second determination criterion which is different from a first determination criterion used for obtaining the optimum recording condition in step (b), as the distinguishing information.

17. An information recording and reproduction method according to claim 16, further comprising step (d) of determining whether or not the distinguishing information recorded in the border area is suitable based on the second determination criterion.

18. An information recording and reproduction method used for an information recording medium including a data recording area for recording data and a parameter calibration area for recording recording condition information, the method comprising the steps of:
 (e) recording the recording condition information in a portion of the parameter calibration area; and
 (f) obtaining an optimum recording condition based on a reproduction state of the recording condition information recorded in the portion of the parameter calibration area,
 wherein the recording condition information recorded in an area, in a used area of the parameter calibration area, in contact with an unused area functions as distinguishing information for distinguishing a border between the used area and the unused area, the used area and the unused area both being in the parameter calibration area, and the used area having the recording condition information recorded therein and the unused area having no recording condition information.

19. An information recording and reproduction method according to claim 18, wherein the recording condition obtained based on the reproduction state of the recording condition information defines an operation condition of an information recording and reproduction apparatus capable of mounting the information recording medium, the operation condition being used when the information recording and reproduction apparatus records data.

20. An information recording and reproduction method according to claim 18, wherein step (e) includes the step of detecting a border between an area having the recording condition information recorded therein and an area having no recording condition information, and recording the recording condition information in the area having no recording condition information in a direction from the border, both of the areas being in the parameter calibration area.

21. An information recording and reproduction method according to claim 18, wherein the information recording medium further includes a recording condition storage area for recording a recording condition, and step (e) includes the step of recording the recording condition information based on the recording condition recorded in the recording condition storage area.

22. An information recording and reproduction method according to claim 21, wherein step (e) further includes the step of recording the recording condition, recorded in the recording condition storage area, in an area in contact with the unused area.

23. An information recording and reproduction method used for an information recording medium including a data recording area for recording data and a parameter calibration area for recording recording condition information, the method comprising the steps of:
 (g) recording the recording condition information in a portion-of the parameter calibration area;
 (h) obtaining an optimum recording condition based on a reproduction state of the recording condition information recorded in the portion of the parameter calibration area; and
 (i) determining whether or not the recording condition information recorded in an area, in a used area of the parameter calibration area, in contact with an unused area functions as distinguishing information for distinguishing a border between the used area and the unused area, the used area and the unused area both being in the parameter calibration area, and the used area having the recording condition information recorded therein and the unused area having no recording condition information.

24. An information recording and reproduction method according to claim 23, wherein the recording condition obtained based on the reproduction state of the recording condition information defines an operation condition of an information recording and reproduction apparatus capable of mounting the information recording medium, the operation condition being used when the information recording and reproduction apparatus records data.

25. An information recording and reproduction method according to claim 23, wherein step (g) includes the step of detecting a border between an area having the recording condition information recorded therein and an area having no recording condition information, and recording the recording condition information in the area having no recording condition information in a direction from the border, both of the areas being in the parameter calibration area.

26. An information recording and reproduction method according to claim 23, further comprising step (j) of, when the recording condition information recorded in the area in contact with the unused area is determined not to function as the distinguishing information, recording the distinguishing information in the unused area in a direction from the border.

27. An information recording and reproduction method according to claim 23, wherein the information recording medium further includes a recording condition storage area for recording a recording condition.

28. An information recording and reproduction method according to claim 27, wherein step (i) includes the step of recording the distinguishing information based on the recording condition recorded in the recording condition storage area.

29. An information recording and reproduction method according to claim 27, wherein step (g) includes the step of recording the recording condition information based on the recording condition recorded in the recording condition storage area.

30. An information recording and reproduction apparatus used for an information recording medium including a data recording area for recording data and a parameter calibration area for recording recording condition information, the apparatus comprising:
  a recording control section for recording the recording condition information in a portion of the parameter calibration area; and
  a recording adjustment information processing section for obtaining an optimum recording condition based on a reproduction state of the recording condition information recorded in the portion of the parameter calibration area,
  wherein the recording control section records distinguishing information for distinguishing a border between a used area and an unused area both in the parameter calibration area in a border area between the used area and the unused area, the used area having the recording condition information recorded therein and the unused area having no recording condition information.

31. An information recording and reproduction apparatus according to claim 30, wherein the recording condition obtained based on the reproduction state of the recording condition information defines an operation condition of the information recording and reproduction apparatus, the operation condition being used when the information recording and reproduction apparatus records data.

32. An information recording and reproduction apparatus according to claim 30, wherein the recording adjustment information processing section detects a border between an area having the recording condition information recorded therein and an area having no recording condition information, and the recording control section records the recording condition information in the area having no recording condition information in a direction from the border, both of the areas being in the parameter calibration area.

33. An information recording and reproduction apparatus according to claim 30, wherein the recording control section records the distinguishing information based on the optimum recording condition.

34. An information recording and reproduction apparatus according to claim 30, wherein the recording control section records information, capable of obtaining the recording condition based on a second determination criterion which is different from a first determination criterion used for obtaining the optimum recording condition by the recording adjustment information processing section, as the distinguishing information.

35. An information recording and reproduction apparatus according to claim 34, wherein the recording adjustment information processing section determines whether or not the distinguishing information recorded in the border area is suitable based on the second determination criterion.

36. An information recording and reproduction apparatus used for an information recording medium including a data recording area for recording data and a parameter calibration area for recording recording condition information, the apparatus comprising:
  a recording control section for recording the recording condition information in a portion of the parameter calibration area; and
  a recording adjustment information processing section for obtaining an optimum recording condition based on a reproduction state of the recording condition information recorded in the portion of the parameter calibration area,
  wherein the recording condition information recorded in an area, in a used area of the parameter calibration area, in contact with an unused area functions as distinguishing information for distinguishing a border between the used area and the unused area, the used area and the unused area both being in the parameter calibration area, and the used area having the recording condition information recorded therein and the unused area having no recording condition information.

37. An information recording and reproduction apparatus according to claim 36, wherein the recording condition obtained based on the reproduction state of the recording condition information defines an operation condition of the information recording and reproduction apparatus, the operation condition being used when the information recording and reproduction apparatus records data.

38. An information recording and reproduction apparatus according to claim 36, wherein the recording adjustment information processing section detects a border between an area having the recording condition information recorded therein and an area having no recording condition information, and the recording control section records the recording condition information in the area having no recording condition information in a direction from the border, both of the areas being in the parameter calibration area.

39. An information recording and reproduction apparatus according to claim 36, wherein the information recording medium further includes a recording condition storage area for recording a recording condition, and the recording control section records the recording condition information based on the recording condition recorded in the recording condition storage area.

40. An information recording and reproduction apparatus according to claim 39 wherein the recording control section records the recording condition, stored in the recording condition storage area, in an area, in an unused area of the parameter calibration area, in contact with the unused area.

41. An information recording and reproduction apparatus used for an information recording medium including a data recording area for recording data and a parameter calibration area for recording recording condition information, the apparatus comprising:
  a recording control section for recording the recording condition information in a portion of the parameter calibration area; and
  a recording adjustment information processing section for obtaining an optimum recording condition based on a reproduction state of the recording condition information recorded in the portion of the parameter calibration area, and determining whether or not the recording condition information recorded in an area, in a used area of the parameter calibration area, in contact with an unused area functions as distinguishing information for distinguishing a border between the used area and the unused area, the used area and the unused area both being in the parameter calibration area, and the used area having the recording condition information recorded therein and the unused area having no recording condition information.

42. An information recording and reproduction apparatus according to claim 41, wherein the recording condition obtained based on the reproduction state of the recording condition information defines an operation condition of the information recording and reproduction apparatus, the operation condition being used when the information recording and reproduction apparatus records data.

43. An information recording and reproduction apparatus according to claim 41, wherein the recording adjustment information processing section detects a border between an area having the recording condition information recorded therein and an area having no recording condition information, and the recording control section records the recording condition information in the area having no recording condition information in a direction from the border, both of the areas being in the parameter calibration area.

44. An information recording and reproduction apparatus according to claim 41, wherein the recording adjustment information processing section determines that the recording condition information recorded in the area in contact with the unused area does not function as the distinguishing information, the recording control section records the distinguishing information in the unused area in a direction from the border.

45. An information recording and reproduction apparatus according to claim 41, wherein the information recording medium further includes a recording condition storage area for recording a recording condition.

46. An information recording and reproduction apparatus according to claim 45, wherein the recording control section records the distinguishing information based on the recording condition recorded in the recording condition storage area.

47. An information recording and reproduction apparatus according to claim 45, wherein the recording control section records the recording condition information based on the recording condition recorded in the recording condition storage area.

* * * * *

UNITED STATES PATENT AND TRADEMARK OFFICE
CERTIFICATE OF CORRECTION

PATENT NO. : 6,944,107 B2
DATED : September 13, 2005
INVENTOR(S) : Toshiyuki Fukushima et al.

It is certified that error appears in the above-identified patent and that said Letters Patent is hereby corrected as shown below:

Column 26,
Line 17, "portion-of" should read -- portion of --.

Signed and Sealed this

Twenty-first Day of February, 2006

JON W. DUDAS
*Director of the United States Patent and Trademark Office*